US012560003B2

(12) United States Patent
Peterson et al.

(10) Patent No.: US 12,560,003 B2
(45) Date of Patent: Feb. 24, 2026

(54) FLUSH DOOR HANDLE FOR VEHICLE

(71) Applicant: Magna Mirrors of America, Inc., Holland, MI (US)

(72) Inventors: Eric Peterson, West Olive, MI (US); Justin E. Sobecki, Rockford, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 496 days.

(21) Appl. No.: 17/653,142

(22) Filed: Mar. 2, 2022

(65) Prior Publication Data

US 2022/0282534 A1 Sep. 8, 2022

Related U.S. Application Data

(60) Provisional application No. 63/200,339, filed on Mar. 2, 2021.

(51) Int. Cl.

*E05B 85/10* (2014.01)
*E05B 81/06* (2014.01)
*E05B 81/90* (2014.01)
*E05B 81/34* (2014.01)

(52) U.S. Cl.

CPC ............ *E05B 85/107* (2013.01); *E05B 81/06* (2013.01); *E05B 81/90* (2013.01); *E05B 85/103* (2013.01)

(58) Field of Classification Search

CPC ...... E05B 85/103; E05B 85/107; E05B 81/06; E05B 81/90; Y10T 292/307; Y10T 292/308

See application file for complete search history.

(56) References Cited

U.S. PATENT DOCUMENTS

| | | | |
|---|---|---|---|
| 5,123,687 | A | 6/1992 | Pfeiffer et al. |
| 5,371,659 | A | 12/1994 | Pastrick et al. |
| 5,497,305 | A | 3/1996 | Pastrick et al. |
| 5,497,306 | A | 3/1996 | Pastrick |
| 5,669,699 | A | 9/1997 | Pastrick et al. |
| 5,671,996 | A | 9/1997 | Bos et al. |
| 5,786,772 | A | 7/1998 | Schofield et al. |
| 5,823,654 | A | 10/1998 | Pastrick et al. |
| 5,929,786 | A | 7/1999 | Schofield et al. |
| 5,938,321 | A | 8/1999 | Bos et al. |
| 6,086,229 | A | 7/2000 | Pastrick |
| 6,139,172 | A | 10/2000 | Bos et al. |
| 6,149,287 | A | 11/2000 | Pastrick et al. |
| 6,152,590 | A | 11/2000 | Furst et al. |
| 6,176,602 | B1 | 1/2001 | Pastrick et al. |

(Continued)

*Primary Examiner* — Carlos Lugo
(74) *Attorney, Agent, or Firm* — HONIGMAN LLP

(57) ABSTRACT

A vehicular exterior door handle assembly includes a base portion disposed at a door handle region of a vehicle door. A handle portion is movable relative to the base portion between a recessed position and a deployed position. An actuator includes a motor that is electrically operable to move the handle portion between the recessed position and the deployed position. The actuator includes a position indicating element that indicates at least one position of an output shaft of the motor. Responsive to an input signal, the actuator moves the handle portion between the recessed position and the deployed position. While the actuator moves the handle portion, the position indicating element indicates that the output shaft arrives at one of the at least one positions and the actuator depowers the motor.

7 Claims, 21 Drawing Sheets

(56) References Cited

U.S. PATENT DOCUMENTS

| | | | | |
|---|---|---|---|---|
| 6,198,409 | B1 | 3/2001 | Schofield et al. | |
| 6,227,689 | B1 | 5/2001 | Miller | |
| 6,229,233 | B1 | 5/2001 | Torii et al. | |
| 6,276,821 | B1 | 8/2001 | Pastrick et al. | |
| 6,279,361 | B1 * | 8/2001 | Baukholt ................ | E05B 81/14 292/201 |
| 6,280,069 | B1 | 8/2001 | Pastrick et al. | |
| 6,291,905 | B1 | 9/2001 | Drummond et al. | |
| 6,349,450 | B1 | 2/2002 | Koops et al. | |
| 6,390,264 | B2 | 5/2002 | Torii et al. | |
| 6,396,408 | B2 | 5/2002 | Drummond et al. | |
| 6,416,208 | B2 | 7/2002 | Pastrick et al. | |
| 6,477,464 | B2 | 11/2002 | McCarthy et al. | |
| 6,550,103 | B2 | 4/2003 | Koops et al. | |
| 6,568,839 | B1 | 5/2003 | Pastrick et al. | |
| 6,582,109 | B2 | 6/2003 | Miller | |
| 6,907,643 | B2 | 6/2005 | Koops et al. | |
| 6,977,619 | B2 | 12/2005 | March et al. | |
| 7,026,897 | B2 * | 4/2006 | Lamb ...................... | E05B 81/70 335/207 |
| 7,407,203 | B2 | 8/2008 | Huizenga et al. | |
| 7,492,281 | B2 | 2/2009 | Lynam et al. | |
| 7,581,859 | B2 | 9/2009 | Lynam | |
| 7,626,749 | B2 | 12/2009 | Baur et al. | |
| 7,841,231 | B2 * | 11/2010 | Kang ................. | B62D 15/0215 73/117.02 |
| 7,944,371 | B2 | 5/2011 | Foote et al. | |
| 8,058,977 | B2 | 11/2011 | Lynam | |
| 8,333,492 | B2 | 12/2012 | Dingman et al. | |
| 8,651,536 | B2 * | 2/2014 | Kurebayashi ........... | E05B 81/20 292/216 |
| 8,701,353 | B2 * | 4/2014 | Patel ..................... | E05B 85/103 292/201 |
| 8,786,401 | B2 | 7/2014 | Sobecki et al. | |
| 8,786,704 | B2 | 7/2014 | Foote et al. | |
| 9,605,452 | B2 | 3/2017 | Yoshino et al. | |
| 9,777,515 | B2 * | 10/2017 | Barmscheidt ........... | E05B 81/14 |
| 10,294,692 | B2 * | 5/2019 | Smart ................... | E05B 85/107 |
| 10,550,611 | B2 | 2/2020 | Och | |
| 11,214,994 | B2 * | 1/2022 | Han ........................ | E05B 81/90 |
| 11,306,519 | B2 * | 4/2022 | Ney ....................... | H03K 17/97 |
| 11,499,352 | B2 * | 11/2022 | Guerin .................. | E05B 85/107 |
| 11,536,058 | B2 * | 12/2022 | Han ...................... | E05B 85/103 |
| 11,598,128 | B2 * | 3/2023 | Murata ................... | E05B 81/16 |
| 11,680,432 | B2 | 6/2023 | Sobecki | |
| 11,952,800 | B2 * | 4/2024 | McKibben ............. | G08C 17/02 |
| 2010/0007463 | A1 | 1/2010 | Dingman et al. | |
| 2011/0148575 | A1 | 6/2011 | Sobecki et al. | |
| 2016/0298366 | A1 | 10/2016 | Och | |
| 2017/0089102 | A1 * | 3/2017 | Yoshino .................. | E05B 79/22 |
| 2018/0106082 | A1 | 4/2018 | Brown et al. | |
| 2020/0102773 | A1 | 4/2020 | Sobecki | |
| 2022/0325563 | A1 * | 10/2022 | Kleister .................. | E05B 81/34 |

* cited by examiner

PRIOR ART

98A

| Actuator CW Direction | | | | |
|---|---|---|---|---|
| Normal Switch | Pull Back Switch | Timer | Mode | Output |
| 0 | 0 | RUNNING | NORMAL | 1 |
| 0 | 0 | RUNNING | POWER PB | 0 |
| 0 | 0 | STOPPED | NORMAL | 0 |
| 0 | 0 | STOPPED | POWER PB | 0 |
| 0 | 1 | RUNNING | NORMAL | 1 |
| 0 | 1 | RUNNING | POWER PB | 0 |
| 0 | 1 | STOPPED | NORMAL | 1 |
| 0 | 1 | STOPPED | POWER PB | 0 |
| 1 | 0 | RUNNING | NORMAL | 1 |
| 1 | 0 | RUNNING | POWER PB | 1 |
| 1 | 0 | STOPPED | NORMAL | 1 |
| 1 | 0 | STOPPED | POWER PB | 1 |
| 1 | 1 | RUNNING | NORMAL | 1 |
| 1 | 1 | RUNNING | POWER PB | 1 |
| 1 | 1 | STOPPED | NORMAL | 0 |
| 1 | 1 | STOPPED | POWER PB | 0 |

98B

| Actuator CCW Direction | | | | |
|---|---|---|---|---|
| Normal Switch | Pull Back Switch | Timer | Mode | Output |
| 0 | 0 | RUNNING | NORMAL | 0 |
| 0 | 0 | RUNNING | POWER PB | 1 |
| 0 | 0 | STOPPED | NORMAL | 0 |
| 0 | 0 | STOPPED | POWER PB | 0 |
| 0 | 1 | RUNNING | NORMAL | 1 |
| 0 | 1 | RUNNING | POWER PB | 1 |
| 0 | 1 | STOPPED | NORMAL | 1 |
| 0 | 1 | STOPPED | POWER PB | 1 |
| 1 | 0 | RUNNING | NORMAL | 0 |
| 1 | 0 | RUNNING | POWER PB | 1 |
| 1 | 0 | STOPPED | NORMAL | 0 |
| 1 | 0 | STOPPED | POWER PB | 1 |
| 1 | 1 | RUNNING | NORMAL | 1 |
| 1 | 1 | RUNNING | POWER PB | 1 |
| 1 | 1 | STOPPED | NORMAL | 0 |
| 1 | 1 | STOPPED | POWER PB | 0 |

FIG. 9B

FLUSH DOOR HANDLE FOR VEHICLE

CROSS REFERENCE TO RELATED APPLICATION

The present application claims the filing benefits of U.S. provisional application Ser. No. 63/200,339, filed Mar. 2, 2021, which is hereby incorporated herein by reference in its entirety.

FIELD OF THE INVENTION

The present invention relates to handles for vehicles and, more particularly, to an exterior handle for opening a side door and/or liftgate of a vehicle or interior handle for opening a side door and/or liftgate of a vehicle.

BACKGROUND OF THE INVENTION

A door handle for a vehicle door typically includes a handle portion that is pivotable relative to a base portion, whereby pivotal movement of the handle portion actuates a latch mechanism to open the door. Typically, a door handle is a pull strap handle with a strap handle portion that protrudes outwardly from the side of the vehicle for grasping by the person opening the door of the vehicle. Alternately, paddle type door handle assemblies are known, where a paddle portion is pivotally mounted to a base portion and is pulled generally outwardly and upwardly to open the vehicle door. Such paddle type door handle assemblies typically protrude outwardly from the vehicle door when in their unpulled state and have an open recess below the paddle portion for receiving a user's fingers for grasping the paddle portion.

SUMMARY OF THE INVENTION

The present invention provides an extendable flush door handle assembly for opening a door of a vehicle (such as a side door or rear door or liftgate of a vehicle) that includes a handle portion that is disposed at the door such that, when not in use to open the vehicle door, the handle portion is recessed at the door, with the outer surface of the handle portion generally flush with or generally coplanar with (or only slightly protruding from) the outer surface of the door panel at the door handle region of the door. The door handle assembly is operable to extend or move the handle portion outward from the door panel when a user is to use the handle to open the vehicle door, such as in response to a signal from a key fob or a passive entry system or the like. When so extended or moved to a deployed position, the handle may be readily grasped by the user and actuated or pulled or moved further outward to open the vehicle door. After the user releases the handle, the handle may return to its non-use or partially recessed position where its outer surface is generally flush or coplanar with (or only slightly protruding from) the outer surface of the door panel.

In an aspect of the invention, the door handle assembly includes a base portion disposed at a door handle region of a vehicle and a handle portion including a base end, a swing end, and a grasping portion disposed between the base end and the swing end. The handle portion is movable relative to the base portion between a recessed position, where the grasping portion of the handle portion is recessed at the base portion so as to be not graspable by a user, and a deployed position, where the grasping portion of the handle portion protrudes outward from the base portion to be graspable by the user. The assembly includes an actuator including a motor that is electrically operable in response to an input signal. The motor includes an output shaft operably coupled to the handle portion to move the handle portion between the recessed position and the deployed position. The actuator includes a position indicating element that indicates a plurality of positions. The plurality of positions includes at least (i) a first position of the output shaft of the motor that corresponds with the handle portion being in the recessed position and (ii) a second position of the output shaft of the motor that corresponds with the handle portion being in the deployed position. Responsive to the input signal, the motor operates and the actuator moves the handle portion between the recessed position and the deployed position. As the motor operates to move the handle portion, the position indicating element indicates when the output shaft arrives at (i) the first position or (ii) the second position. Responsive to the position indicating element indicating the output shaft arrived at the first position or the second position, the actuator depowers the motor.

These and other objects, advantages, purposes and features of the present invention will become apparent upon review of the following specification in conjunction with the drawings.

BRIEF DESCRIPTION OF THE DRAWINGS

FIGS. 9A-9C are schematic views of truth tables for the states of an actuator in accordance with the present invention;

DESCRIPTION OF THE PREFERRED EMBODIMENTS

Figure 1:
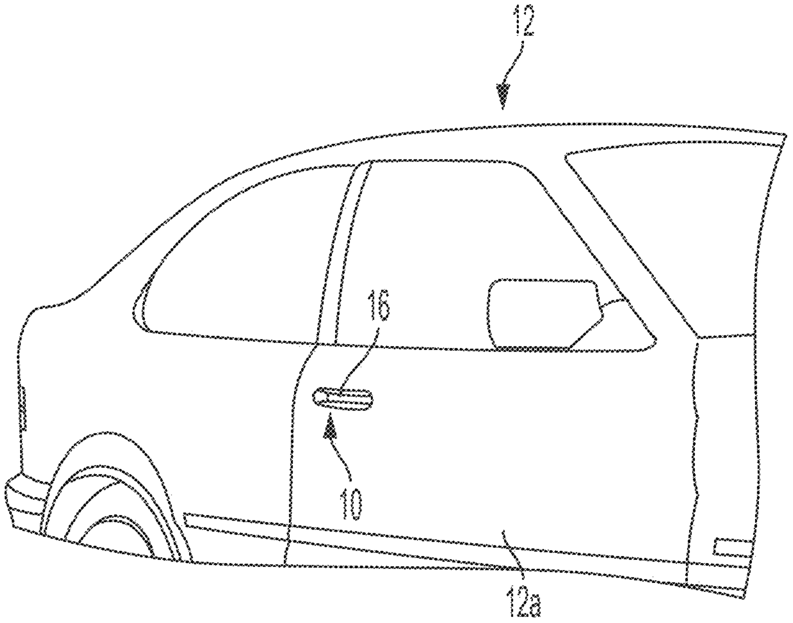
FIG. 1 is a perspective view of a vehicle with an extendable flush door handle assembly in accordance with the present invention.
Figure 2:
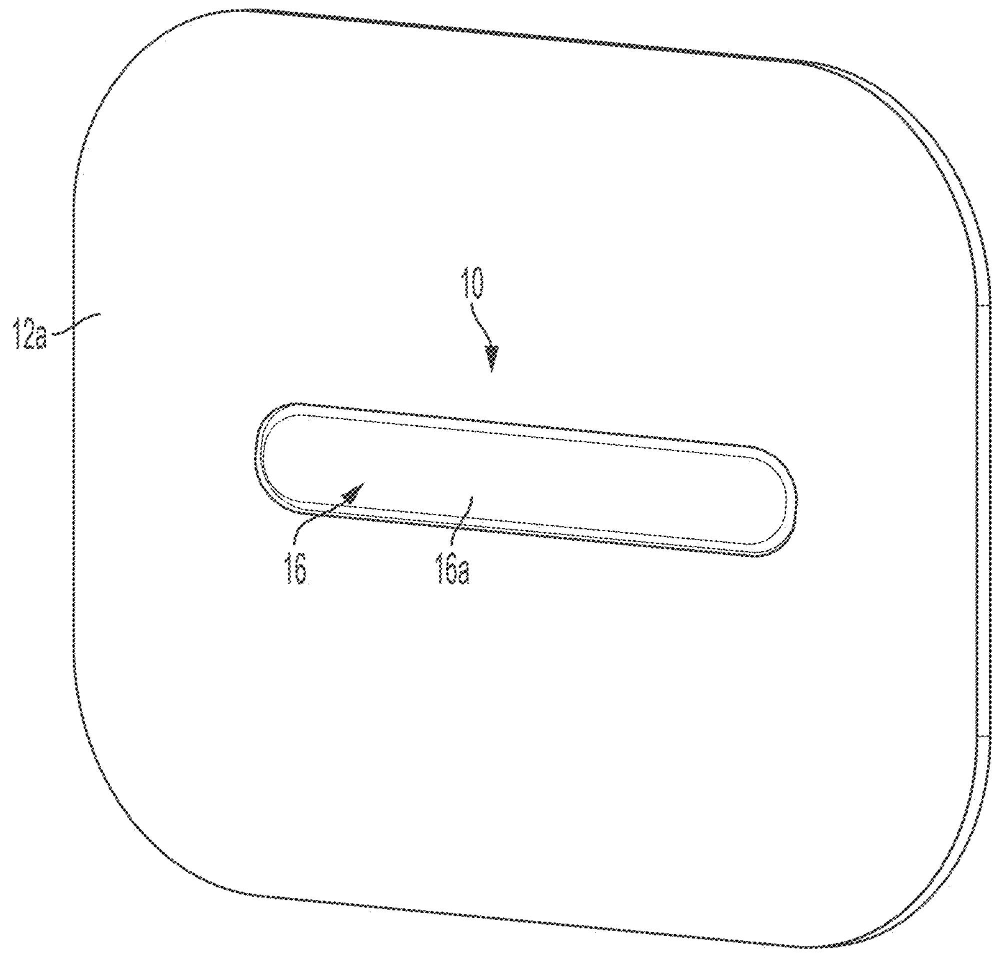
FIG. 2 is an enlarged perspective view of the extendable flush door handle assembly of FIG. 1 at the vehicle door, with the door handle in its flush or non-use or recessed position.
Figure 3:
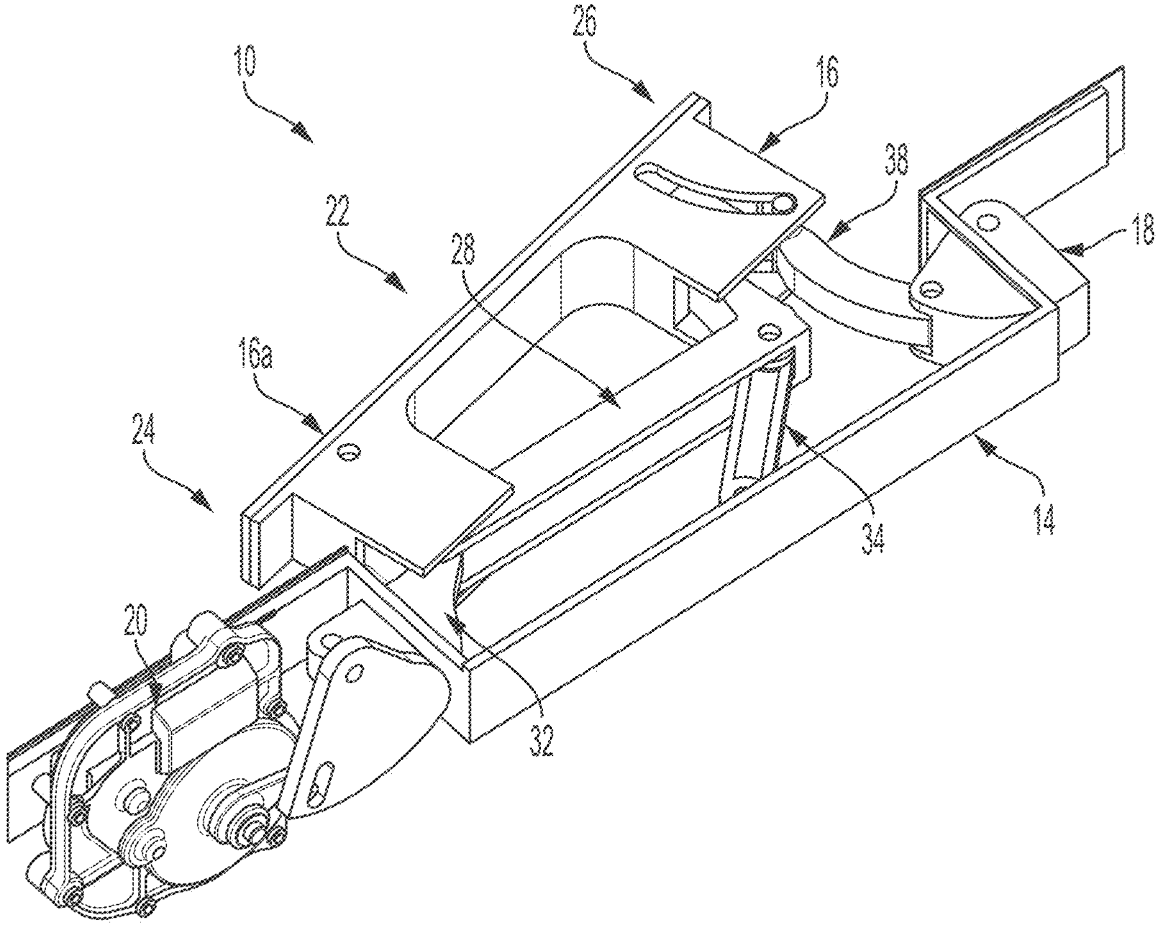
FIG. 3 is a perspective view of an extendable flush door handle assembly of the present invention.

Referring now to the drawings and the illustrative embodiments depicted therein, a vehicle handle assembly or module or unit or extendable flush door handle assembly 10 is mountable to a door 12*a* of a vehicle 12 and operable to release a latch mechanism of the vehicle door 12*a* to open the vehicle door (FIG. 1). Vehicle handle assembly 10 includes a base portion or bracket 14 that is mountable to a vehicle door and a handle or strap portion 16 that is pivotally mounted to bracket 14 (FIG. 3). When not in use, handle portion 16 is at an initial rest or recessed or non-use position and is received or disposed at or partially in base portion 14 so that an outer surface 16*a* of handle portion 16 is generally flush with or generally coplanar with (or protruding only slightly from or recessed slightly from) the outer surface 14*a* of the base portion 14 or the door panel, whereby handle portion 16 is not readily usable by a user (FIG. 2). Handle portion 16 is electromechanically pivotable or movable or laterally movable relative to the door and the base portion 14 to move to its ready or operational or grippable or graspable or person-operable position and is then graspable or grippable by a user and is manually moved (such as via pulling by the user) to actuate a bellcrank 18 at base portion 14, which in turn actuates or releases the latch mechanism of the door to open the vehicle door. Handle assembly 10 includes an electrically operable or electromechanical actuator 20 at base portion 14 for imparting the lateral movement of handle portion 16 relative to base portion 14 (such as automatically imparting such handle movement in response to a signal from a key fob or a passive entry system or the like) so that handle portion 16 is automatically moved from its recessed position to its ready or graspable position where a user can grasp the handle portion to pull or move the handle portion for unlatching and/or opening the vehicle door and/or the like, as discussed below.

The handle assembly 10 may comprise any suitable type of handle assembly, and may include or incorporate aspects of the door handle assemblies described in U.S. Pat. Nos. 8,786,401; 6,977,619; 7,407,203 and/or 8,333,492, and/or U.S. Publication No. US-2020/0102773, which are all hereby incorporated herein by reference in their entireties. Optionally, aspects of handle assembly 10 may be suitable for use with a liftgate handle assembly for a liftgate or tailgate of a vehicle, while remaining within the spirit and scope of the present invention.

Figure 6:
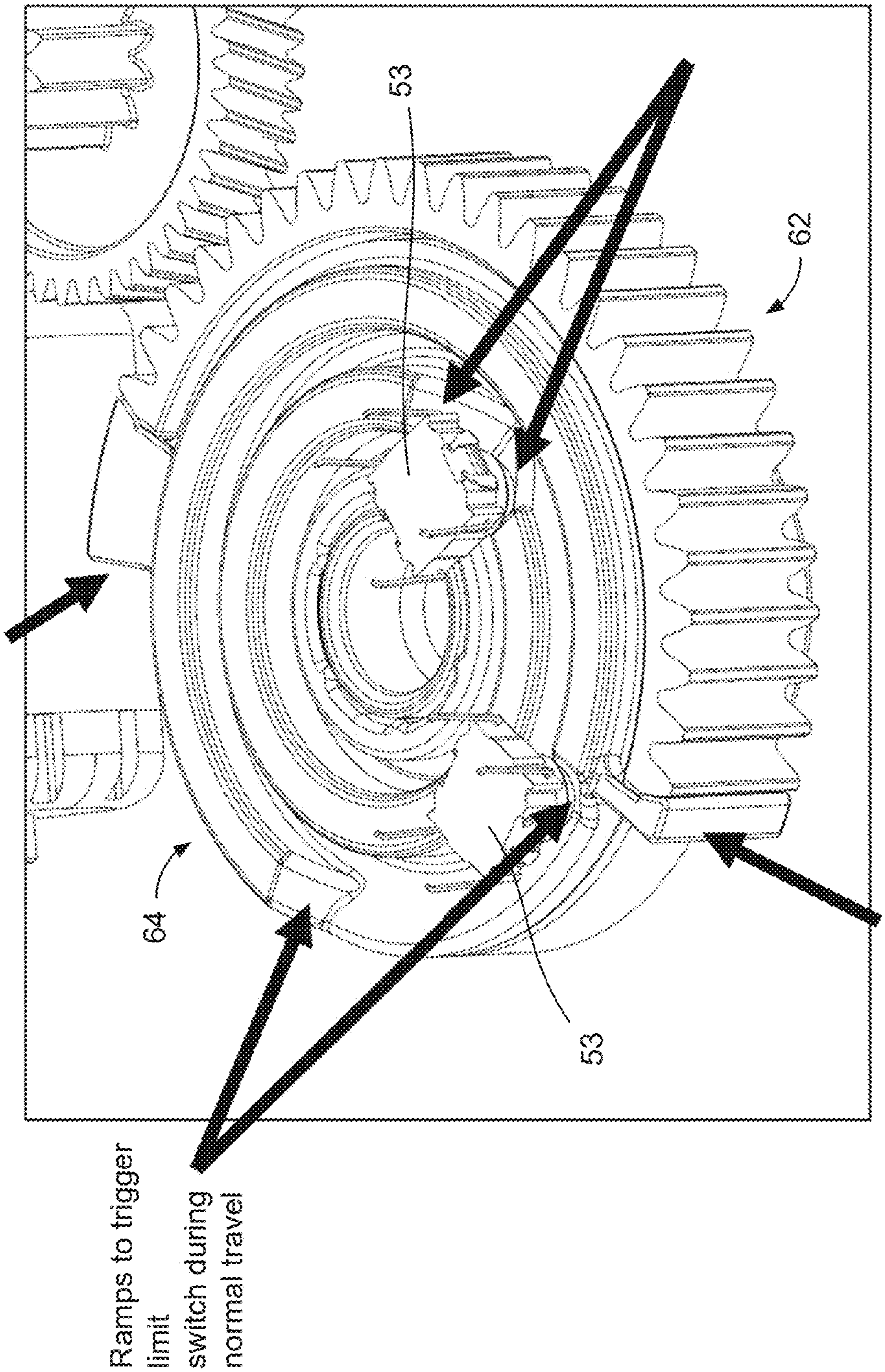
FIG. 6 is a perspective view of an output gear and indicator of the actuator of FIG. 5.

In the illustrated embodiment, handle or strap portion 16 includes a grasping portion 22 for a user to grab and pull at to open the vehicle door. Handle portion 16 further includes a base end 24 and a swing end 26 at opposing ends of the grasping portion 22. The base end 24 of the handle portion 16 is hingedly connected to one end of a connector 28 at a pivot joint 30, such that when the handle portion 16 pivots, the swing end 26 of the handle portion moves away from the other end of the connector 28 and away from the base portion 14 and away from the vehicle to open the vehicle door. A crank or pivot arm or connecting link 32 pivotally couples the connector 28 to the base portion 14 at the base end of the handle portion via pivot joints 32*a* and 32*b*, and a follower or pivot arm or connecting link 34 pivotally couples the connector 28 at the swing end of the handle portion to the base portion 14 via pivot joints 34*a* and 34*b*. The pivot axis 30 of the base end of the handle portion at the connector 28 is offset or non-coaxial with the pivot axis 32*b* of the connecting link 32 at the connector 28. The connector 28 links or connects the crank 32 and the follower 34 together, such that movement of the crank 32 translates to movement of the connector which, in turn, translates to movement of the follower 34. The concerted movement of crank 32 and follower 34 moves the connector 28 and the handle portion 16 in and out relative to base portion 14, with the connector 28 remaining parallel to the base portion throughout its range of motion, and with the handle portion 16 also remaining parallel to the base portion when moved between the recessed position (FIG. 4) and the deployed position (FIG. 6). As can be seen with reference to FIGS. 4 and 6, the handle portion (and connector) moves or swings outward and in a direction toward the base end of the handle portion as it moves from the recessed position to the deployed position.

Handle portion 16 is operatively coupled to the bellcrank 18 via a bellcrank link 38 that is pivotally attached at the bellcrank 18 and movably or slidably coupled at the swing end of the handle portion. When the swing end of the handle portion is pulled by a user outward away from the vehicle (compare FIGS. 6 and 8), the handle portion pivots and the swing end of the handle portion moves relative to the connector 28 (such as via sliding movement of the end of the connector within the swing end of the handle portion) further outward from the vehicle, pulling at the bellcrank link 38 and causing pivotal movement of the bellcrank 18 to disengage a door latch to allow the vehicle door to be opened. Bellcrank 18 is pivotally mounted to base portion 14 via a pivot element or joint or pin 36 and the bellcrank link 38 connects the swing end of the handle portion 16 to bellcrank 18. In the illustrated embodiment, one end of the bellcrank link 38 is pivotally attached to bellcrank 18 (such that pulling action by the bellcrank link imparts pivotal movement of the bellcrank about its pivot axis), while the other end of the bellcrank link 38 is slidably attached at the swing end of the handle portion via a pin 40 that extends from the other end of bellcrank link 38 is received in and is movable along an arcuate slot 42 at the swing end 26 of the handle portion. As can be seen with reference to FIGS. 6 and 8, a slot end 42*a* at an end of the slot 42 acts against pin 40 and pulls at bellcrank link 38 when the handle is pulled outward.

Implementations herein include a door handle assembly that is operable to track/detect a position of a door handle (such as a flush door handle of FIGS. 1-3) actuator output shaft. The system may be operable to signal to a door control module (DCM) of the vehicle the position of the actuator. The system may be operable to determine when to shut off power to the actuator (i.e., depower the actuator) based on the position of the output shaft of the actuator. The system may include an integrated shut off device for flush door handle actuators.

Flush door handles are a popular feature on some vehicles. These door handles may use electric actuators to pivot or deploy/extend the door handle from a closed position (i.e., flush with the vehicle or non-useable position) to an open position (i.e., a normal operating or usable position). These door handles may include a shut off device (SOD) with a discrete circuit that monitors power draw and is designed to shut off power to a direct current (DC) motor at a preset amount of current for over a period of time that disable the motor when the door handle is fully deployed or retracted/flush (or, in some scenarios, when the door handle is blocked or stuck). For example, the SOD may depower the motor after the motor has been running for greater than two seconds, as two seconds exceed the typical time the motor takes to transition the door handle from the flush state to the deployed state. The discrete circuit may be mounted directly to the motor or be in-line and part of the wire harness. Either configuration allows the motor to stall every cycle as the motor runs longer than necessary to deploy the door handle and pushes against a hard stop, which reduces the life span of the actuator. These configurations also produce a large voltage drop which reduces the motor torque.

Figure 4A:
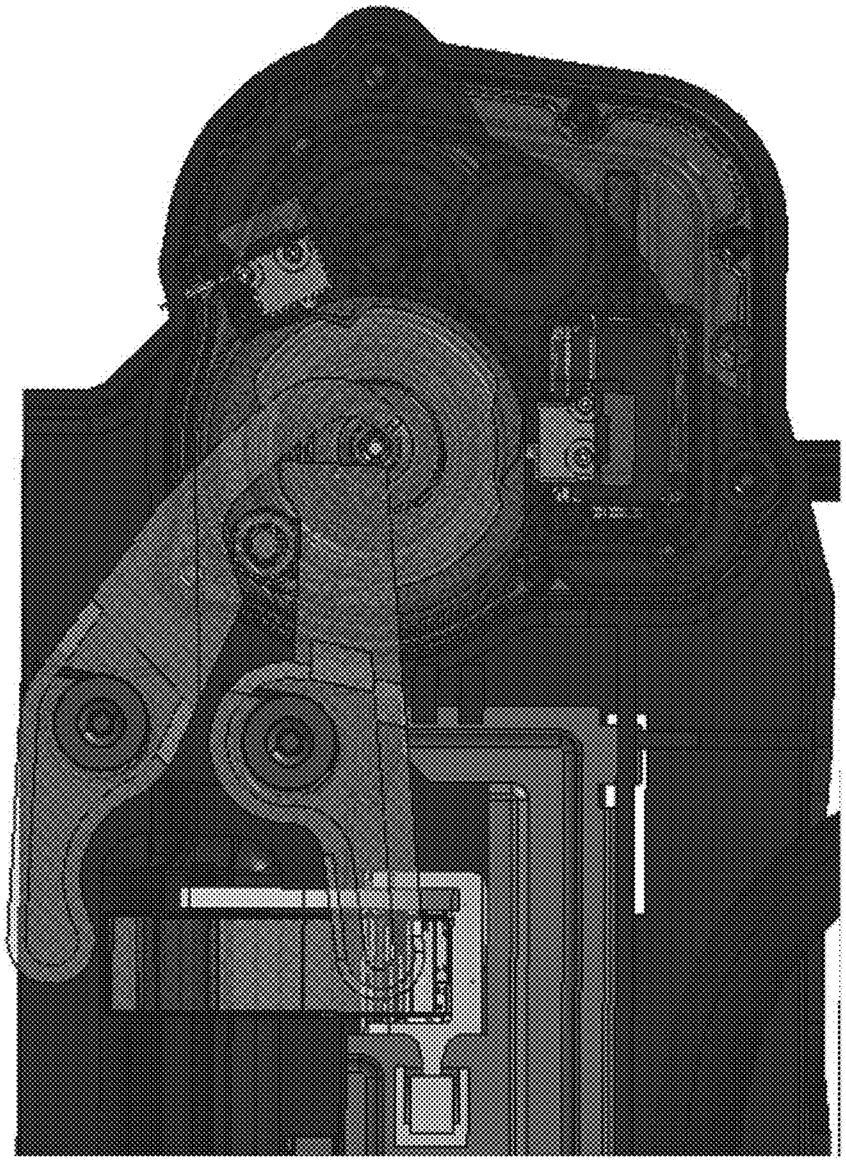
PRIOR ART FIG. 4A
FIGS. 4A and 4B are perspective views of door handle assemblies.
Figure 4B:
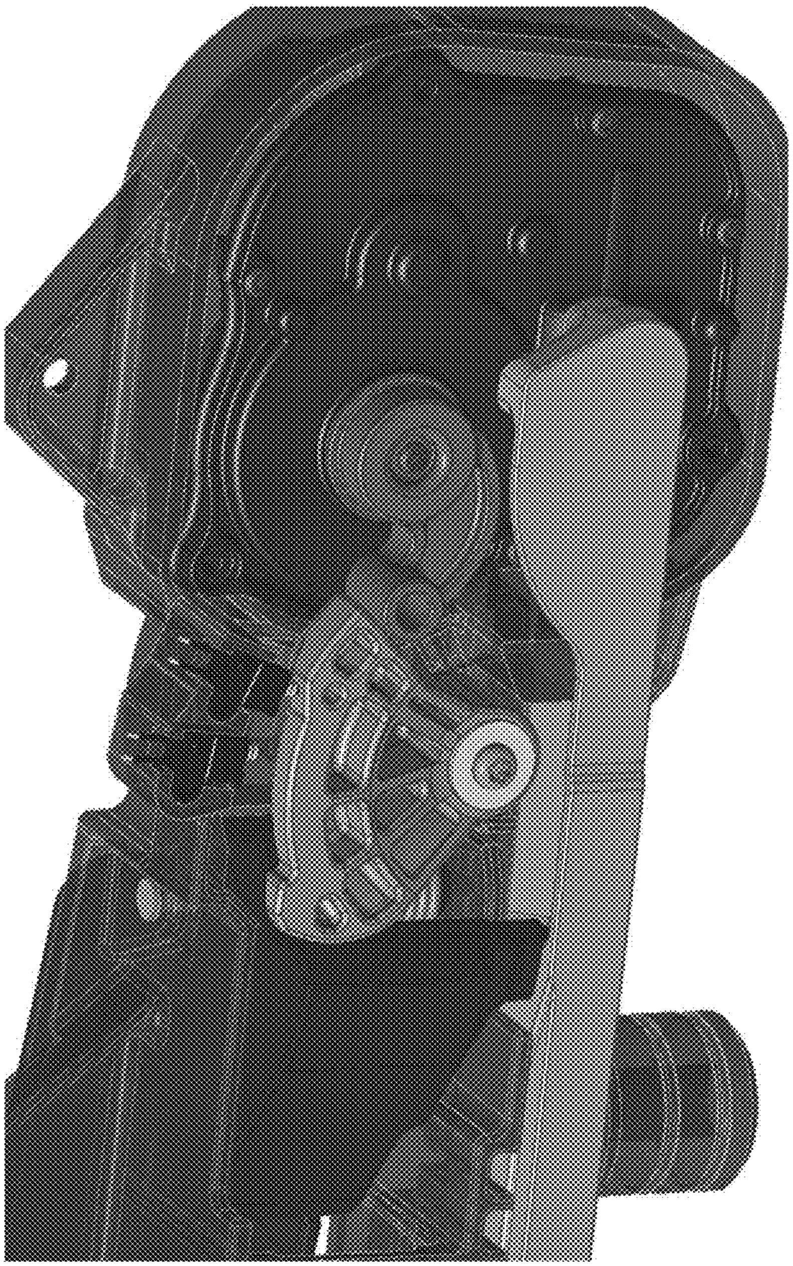

Referring now to FIGS. 4A and 4B, for door handle assemblies that include a flush door handle, the discrete circuit typically tracks the actuator position based on two or more limit switches. The circuit provides the states (i.e., positions) of the limit switches to the DCM and the DCM subsequently controls disabling or shutting off the motor at the appropriate time. This configuration has several disadvantages. First, wired limit switches tend to be expensive. Moreover, the switches tend to be more exposed to the elements (e.g., wet portions of the door). Furthermore, the switches should directly track the actuator output arm to prevent a lost actuator scenario, but this requires a switch plate and custom output cam. Such configurations also require complicated wiring harnesses which incurs additional cost.

Instead, implementations herein describe a door handle assembly that includes a position-based shut off circuit that is built into an actuator. The circuit may include Boolean logic, lost cost limit switches, a simple resistor-capacitive (RC) timer circuit, and a sealed connector (i.e., to seal the actuator/circuitry from the elements). The actuator may not rely on the DCM for control and instead may rely on a time out feature (e.g., a two second time out feature).

Figure 5:
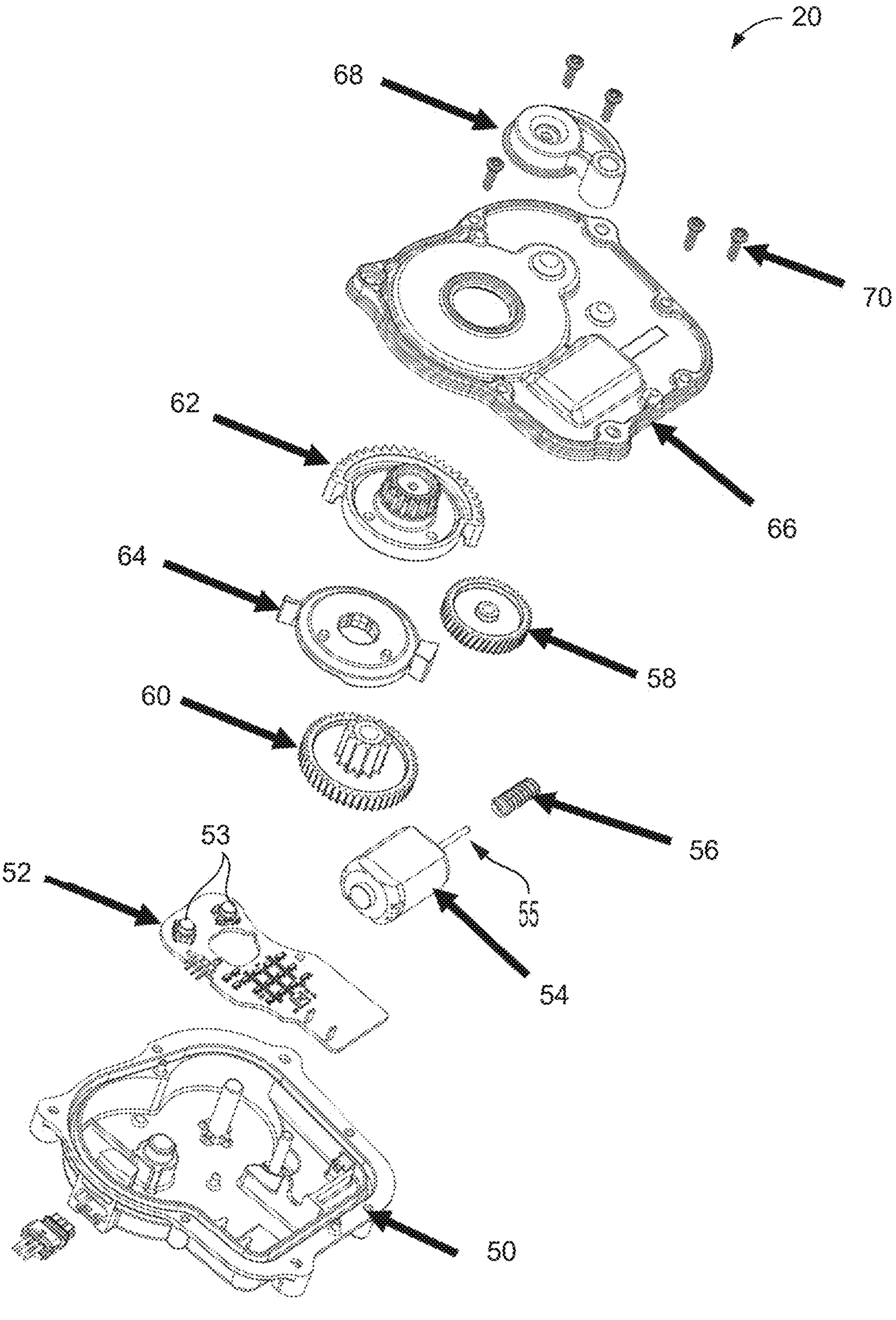
FIG. 5 is an exploded view of an actuator of a door handle assembly in accordance with the present invention.

Referring now to FIG. 5, the door handle assembly includes the actuator 20. The actuator 20 includes a lower housing 50 and an upper housing 66. The upper housing and lower housing, when coupled, enclose a cavity that includes a printed circuit board (PCB) 52 with one or more switches 53 and a motor 54. The motor may drive a worm 56 (i.e., a gear in the form of a screw) which in turn drives a number of gears such as a helical gear 58 and a spur gear 60. The actuator may also include an output selector gear 62 and an indicator 64 (i.e., a position indicating element), along with an output cam 68 and any number of screws 70.

The actuator operates to move the door handle between the flush state and the deployed state. For example, an output shaft 55 of the motor 54 may turn a first direction (e.g., clockwise) to rotate the output gear 62 in the first direction, thereby deploying the door handle. The output shaft 55 of the motor 54 may turn in a second direction (i.e., opposite of the first direction or counter-clockwise) to turn the output gear 62 in the second direction, thereby returning or allowing the door handle to return to the flush state. Optionally, a biasing element (e.g., a spring) provides the force to transition the door handle from the deployed state to the flush state.

In some examples, the actuator may be configured to operate in a "pull back" state. For example, when a biasing element fails to return the door handle to the flush state (e.g., the door handle has iced over and the biasing element is unable to provide sufficient force to free the door handle), the actuator may transition to the pull back state to forcefully retract the door handle to the flush state. The motor may operate in the reverse direction from the "normal" direction (i.e., the direction to deploy the door handle) in order to retract the door handle.

Referring now to FIG. 6, the position indicating element 64 mounts (i.e., is rotationally locked) to the output gear 62. The indicator is configured based on design requirements to set the travel positions of the output cam 68. As explained in more detail below, the position indicating element 64 may include indication positions for two normal travel hard stops (e.g., five degrees past a limit switch) and ramps to trigger each limit switch during normal travel and during power pull back travel. For example, as the output gear is turned by the motor, the indicator 64 (which is rotationally locked to the output gear) also turns. The ramps on the indicator 64 may cause switches 53 (e.g., limit switches) to open and close based on the rotational orientation of the indicator via the ramps. For example, the elevated portion of the ramp may cause the indicator to depress or actuate one or more of the switches 53, thus closing or opening the switch 53. Similarly, when descending the ramp, the indicator may no longer depress or actuate the switch 53. Based on the output of these switches, the actuator and/or the door handle assembly may determine the position of the door handle (i.e., deployed or flush) without stalling the motor by depowering the motor prior to the output gear reaching the hard stop.

In the illustrated embodiment, the indicator 64 includes an indicator or indicating element for each of two different limit switches 53 (i.e., a "normal" switch and a "pull back" switch) disposed on the PCB 52. However, the actuator may include any number of switches 53 depending upon the number of positioned to be detected. Based on the status of each of the switches (i.e., open or closed) and a timer, the actuator may control the motor to deploy the door handle to a deployed state and/or pull back the door handle to a flush state.

Figure 7A:
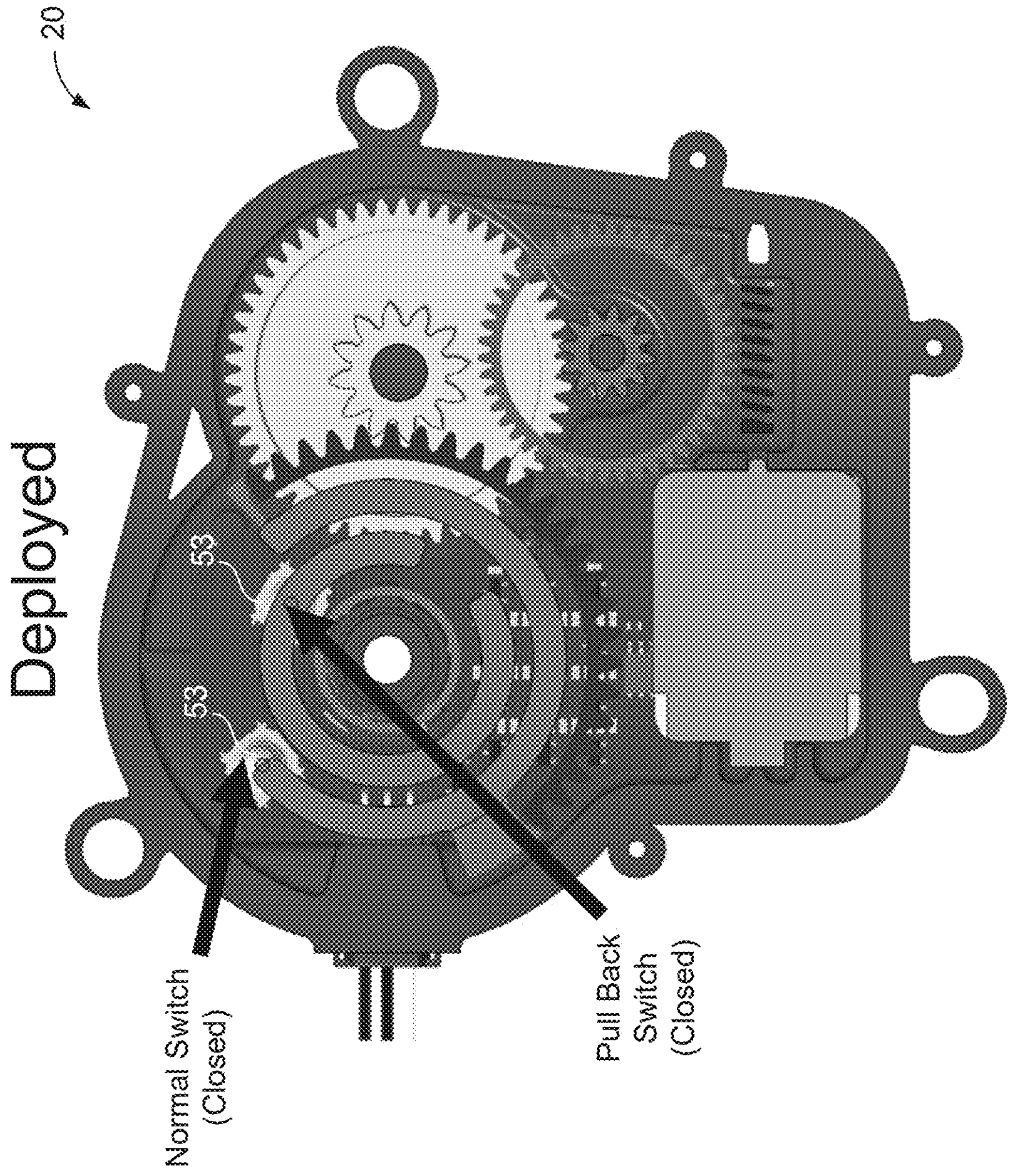
FIGS. 7A-7C are plan views of the actuator of FIG. 5 in a deployed state, a flush state, and a pull back state.
Figure 7B:
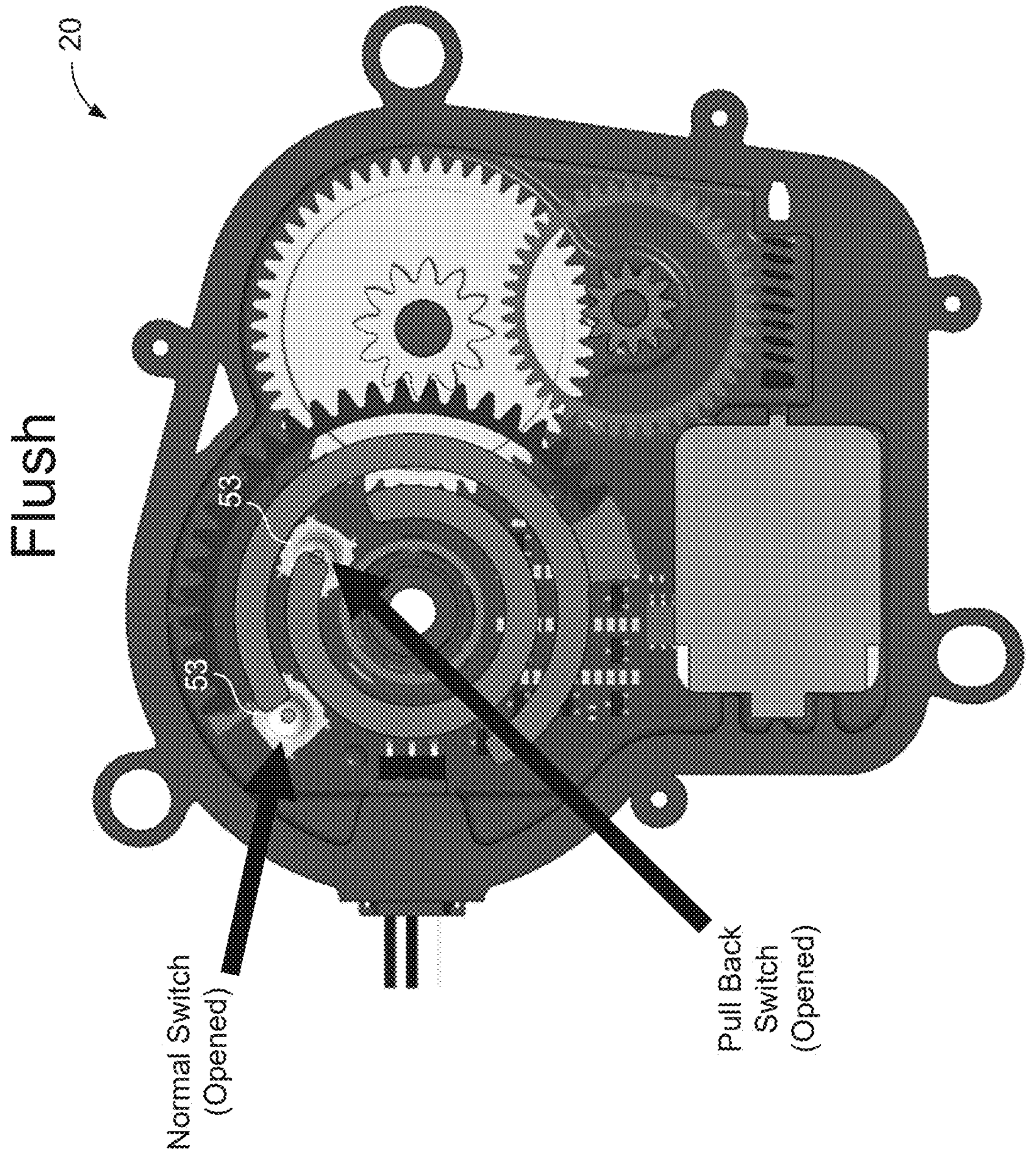
Figure 7C:
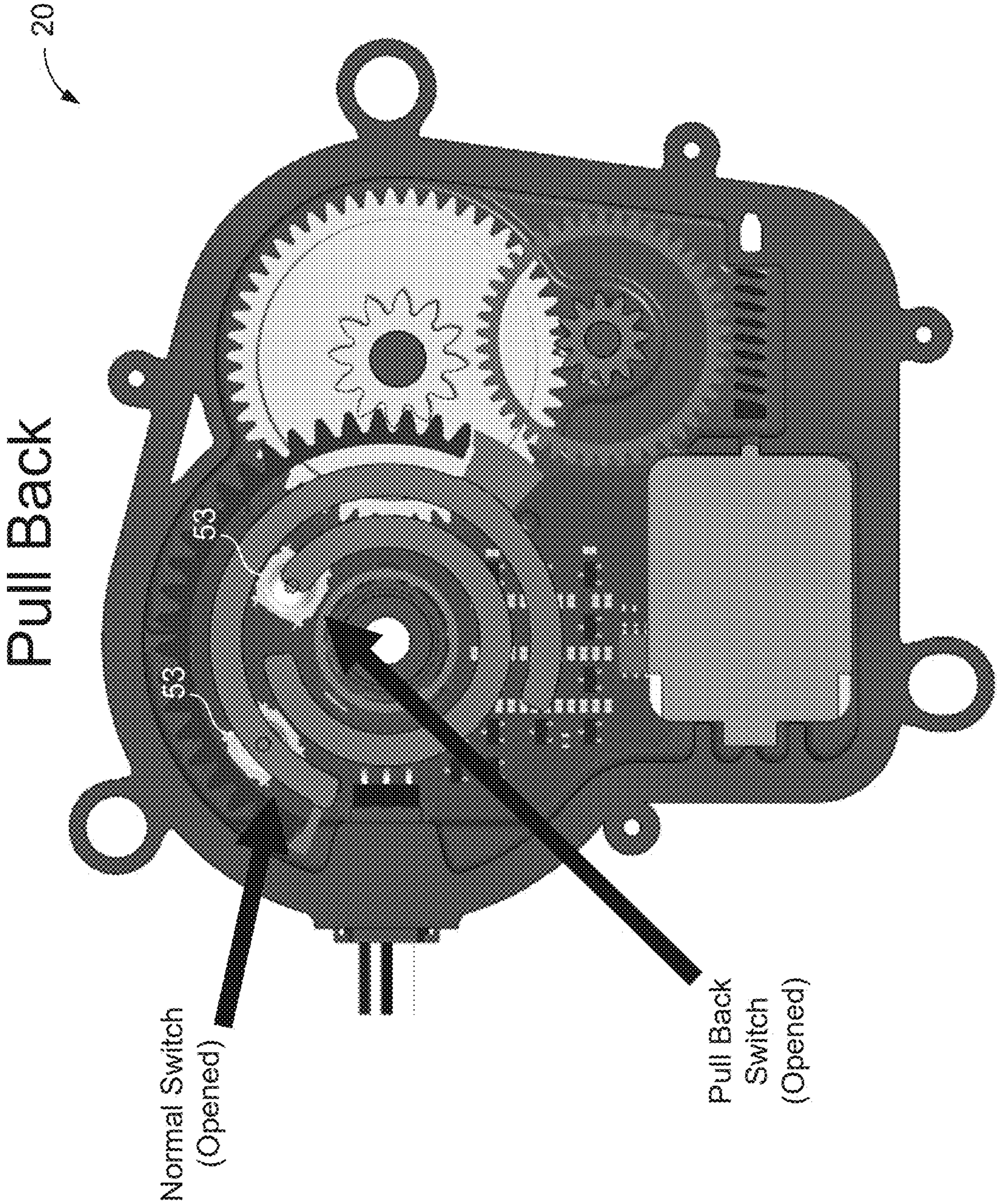

Referring now to FIGS. 7A-7C, in this example, the actuator includes two limit switches 53. In FIG. 7A, in the deployed state (i.e., the door handle is in a useable position), the normal limit switch is closed and the pull back limit switch is also closed (i.e., the ramps on the indicator are in contact with each of the switches, causing the switches to close). In FIG. 7B, an example of the actuator 20 in the flush state is illustrated. Here, the output gear and indicator have turned such that both limit switches are open (i.e., the ramps on the indicator are not in contact with the limit switches). During normal operation, the actuator may transition between the deployed and flush states by rotating the output gear and monitoring the output of the limit switches. As shown in FIG. 7C, in some scenarios, the actuator may transition from the flush state to the pull back state in an attempt to dislodge or "unstick" the door handle from a stuck position by rotating the output gear the opposite direction and monitoring the output of the limit switch. During the pull back state, for example, the normal switch may be open and the pull back switch is also open.

Figure 8:
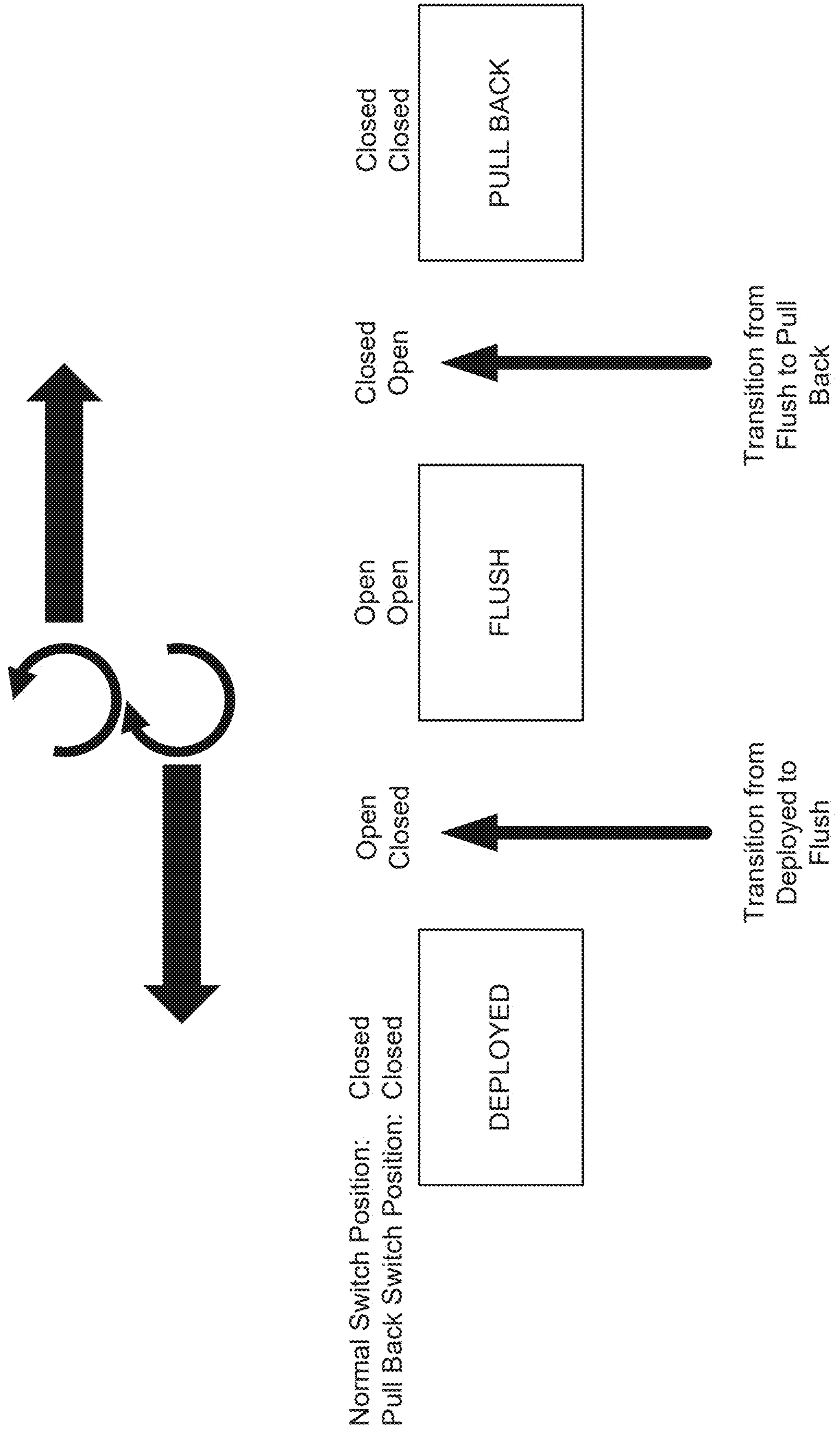
FIG. 8 is a schematic view of the actuator of FIG. 5 transitioning between the deployed state, the flush state, and the pull back state.

Referring now to FIG. 8, in this example, the actuator is configured for the flush state, the deployed state, and the pull back state. While in the flush state, the two switches are both open. Here, rotating the output gear (and thus also the indicator) transitions the actuator from the flush state to the deployed state. The actuator enters the transition when the pull back switch position closes. When the normal switch position also closes, the deployed state has been entered and the actuator may halt power to the motor. Because the hard stop for the output gear is some distance beyond the switch (e.g., five degrees), the actuator may halt power to the motor prior to hitting the hard stop, thus preventing stalling. Similarly, when in the flush state, the output gear may begin rotating counter-clockwise to transition from the flush state to the pull back state. In the transition, the normal switch closes. When the pull back switch also closes, the pull back state has been achieved and the actuator may halt power to the motor prior to hitting the hard stop.

Figure 9A:
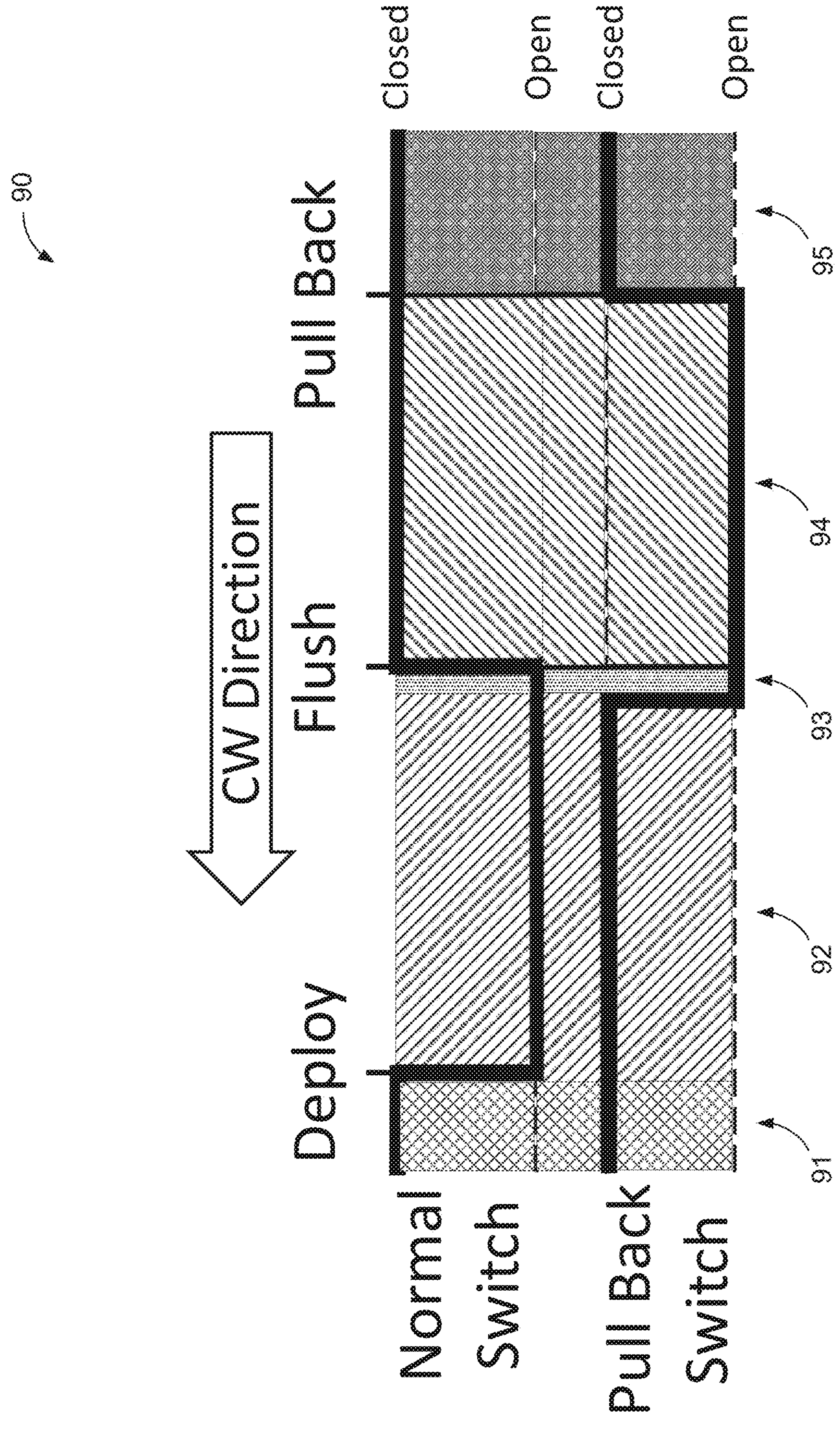
Figure 9C:
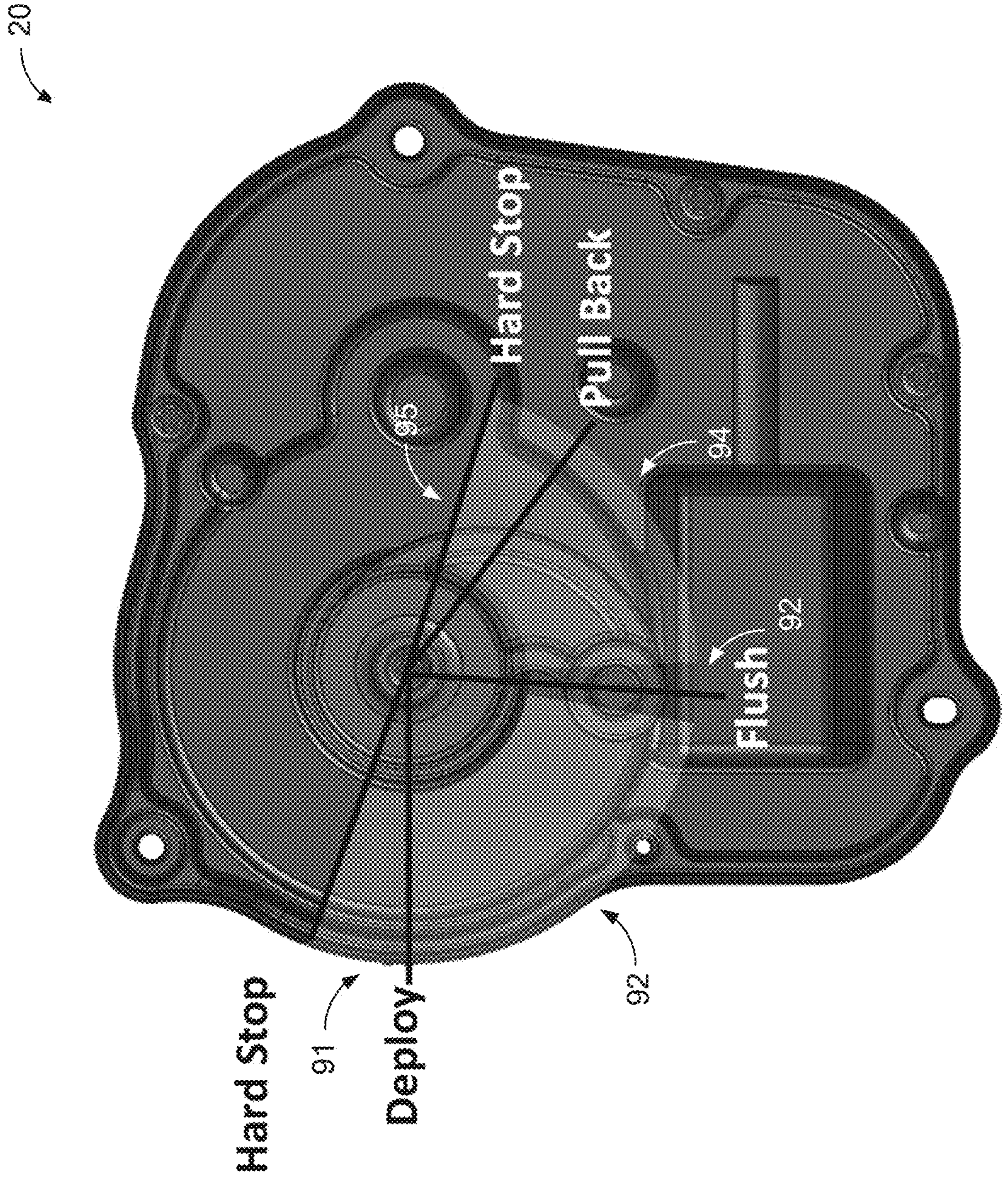

Referring now to FIGS. 9A-9C, a signal diagram 90 (FIG. 9A) and truth tables 98A, 98B (FIG. 9B) illustrates an exemplary encoding of the different states of the actuator. Here, with two switches, up to four states/positions may be encoded and three are used. Specifically, a deploy state 91, a flush state 93, and a pull back state 95 are used. In this example, a first transition states 92 is between the deploy state 91 and the flush state 93 and a second transition state 94 is between the flush state 93 and the pull back state 95.

The motor may be disabled when the deploy state 91 or the pull back state 95 is achieved to stop the motor prior to contact with the hard stops. This is a non-limiting example, and any number of switches may be used to encode any number of states depending upon use requirements. For example, three switches may encode eight different states/positions of the indicator (and, by extension, the door handle). In this example, the encoding of the states is further illustrated in the truth table 98A (for the clockwise direction) and in the truth table 98B (for the counter-clockwise direction). Both tables include switch status (for both the normal switch and the pull back switch), a timer status, and a mode. The switch status indicates whether the switch is open or closed (i.e., a '0' indicates the switch is open and a '1' indicates the switch is closed).

The timer field indicates whether an input timer is running or expired. In some examples, the actuator may include a timer to provide an additional input to the logic. For example, the timer may have a short run time (e.g., approximately 250 milliseconds) that provides initialization and status checking capabilities. Optionally, the timer may be used in place of a processor, microprocessor, or other controller for initializing and/or controlling the actuator. For example, when the actuator is in the flush state, the DCM may apply power to the actuator in a clockwise direction (e.g., by controlling the voltage/current provided to the actuator) in order to deploy the door handle. This voltage may pass through the RC timer at the same time that the motor begins rotating the output gear. If the timer expires prior to the actuator exiting the flush state (i.e., the timer expires before the switch positions indicate that the flush state has been exited), the actuator may determine that the door handle is stuck and may halt power to the motor to prevent additional stalling.

The actuator may have an additional input (e.g., from the DCM) that indicates a mode. The mode may indicate a normal mode or a power pull back mode. When the mode indicates normal mode, the actuator may transition from flush to deployed and from deployed to flush. When in the power pull back state, the actuator may transition from the flush state to the pull back state and back to the flush state (e.g., to dislodge a stuck or frozen door handle). That is, in some examples, the actuator includes an additional power/signal wire that enables a power pull back function.

FIG. 9C illustrates exemplary ranges for the different states 91-95 of the actuator 20. Here, the hard stops in both the clockwise and the counter-clockwise are displayed. Prior to reaching the hard stops, the switches indicate the deployed state and the pull back state. In between these states, the actuator is in the flush state (with transition states existing in between the deployed, flush, and pull back states).

Figure 10:
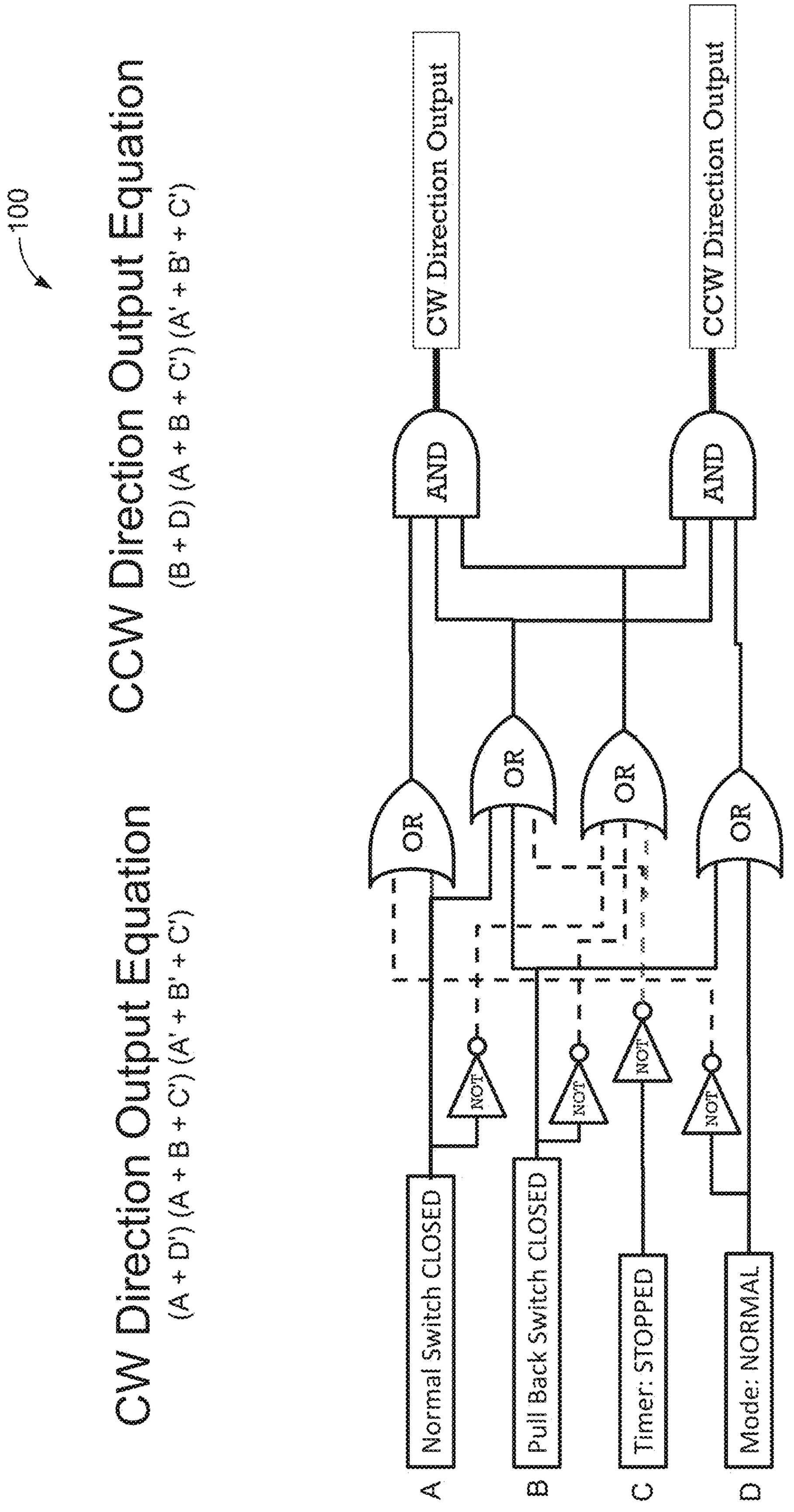
FIG. 10 is a logic diagram of truth tables of FIGS. 9A-9C.

Referring now to FIG. 10, an exemplary logic diagram 100 illustrates the Boolean logic for the illustrated embodiment. Based on the positions of the switches (i.e., '0' or '1'), the status of the timer (i.e., '0' or '1') and the status of the mode signal (i.e., '0' or '1'), the actuator determines whether to halt power to the motor. In some examples, the actuator can only gate the power provided to the motor. That is, the DCM may control enabling power to the motor and the actuator may only have the capability to remove power (and not provide it). The DCM may utilize aspects of the control modules disclosed in U.S. Pat. Publication No. US-2010-0007463, which is hereby incorporated herein by reference in its entirety.

Optionally, the system may implement logic to detect a blocking state or imminent blocking state. The system may determine that when there is no change in position (i.e., no movement of the door handle), the door handle is blocked and the motor should be stopped to improve the robustness of the actuator and increase the longevity of the motor. For example, when the door handle is in the flush position and the actuator attempts to move the door handle to the deployed position, the system may determine the door handle is blocked when the door handle does not make it to the next state (i.e., deployed) in a threshold period of time. Optionally, the system may determine that a slow down or decrease in speed of in motion over time indicates an imminent block (i.e., the door handle is soon to be blocked). For example, the system may time how long the door handle takes to transition from one state to the next (e.g., from flush to deployed and vice versa). The system may determine that when this time increases (i.e., the door handle begins to take longer to transition), a blocking or failure is imminent.

Figure 11A:
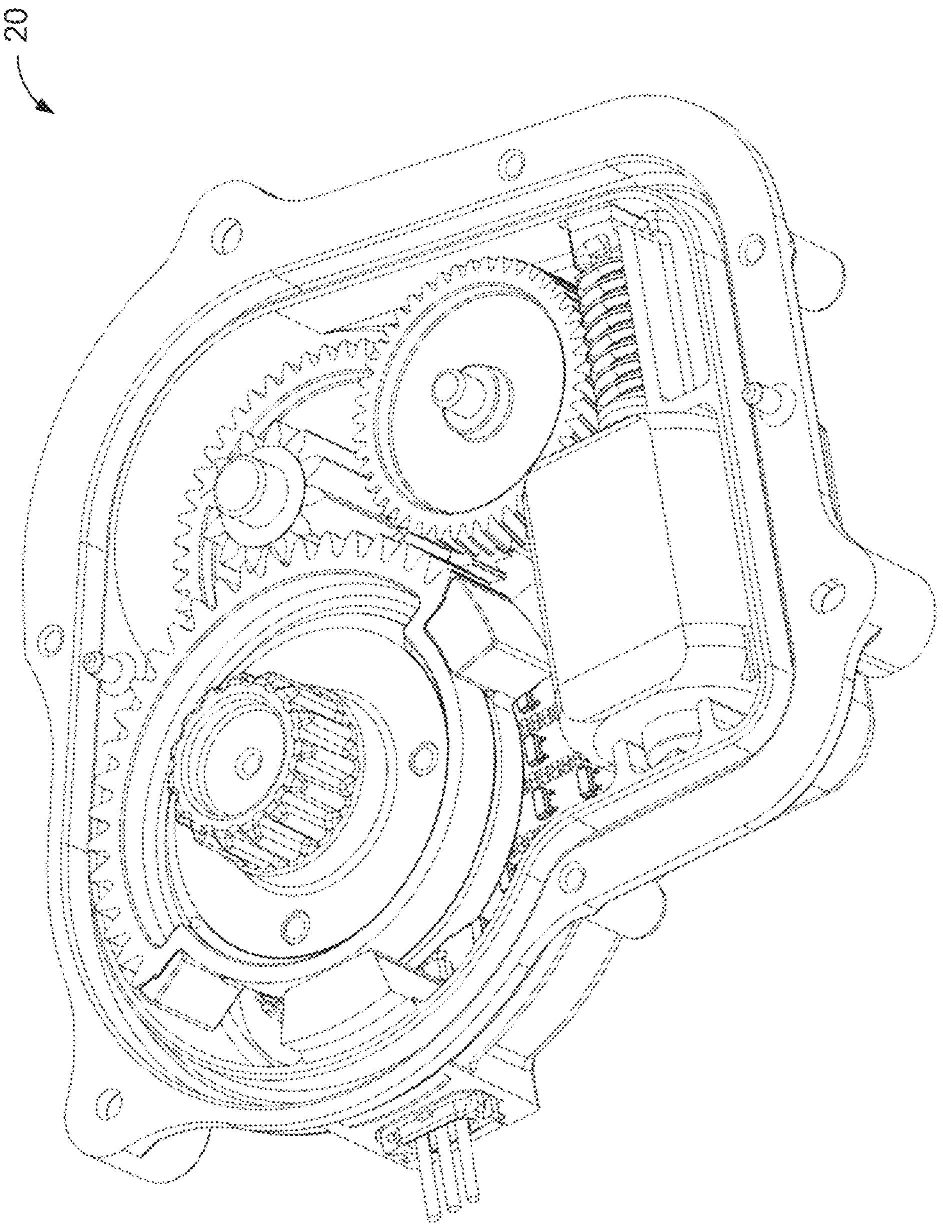
FIGS. 11A and 11B are perspective views of the actuator and a printed circuit board of the actuator of FIG. 5.
Figure 11B:
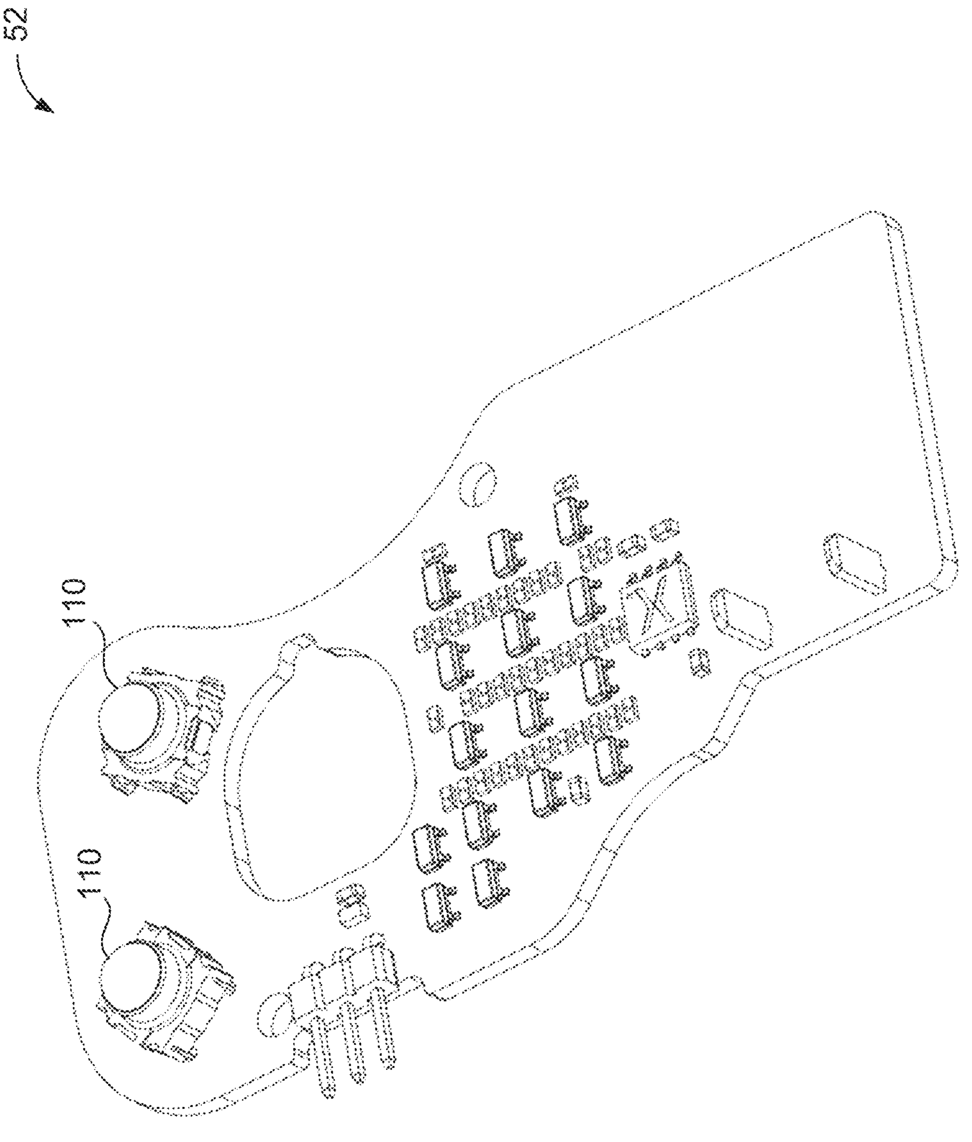

Referring now to FIGS. 11A and 11B, an additional assembled actuator 20 (FIG. 11A) and PCB (FIG. 12B) with two limit switches 110. In this case, the PCB 52 is disposed underneath the indicator such that the ramps of the output gear (as the output gear rotates clockwise and counter-clockwise) engage and disengage the switches.

Figure 12A:
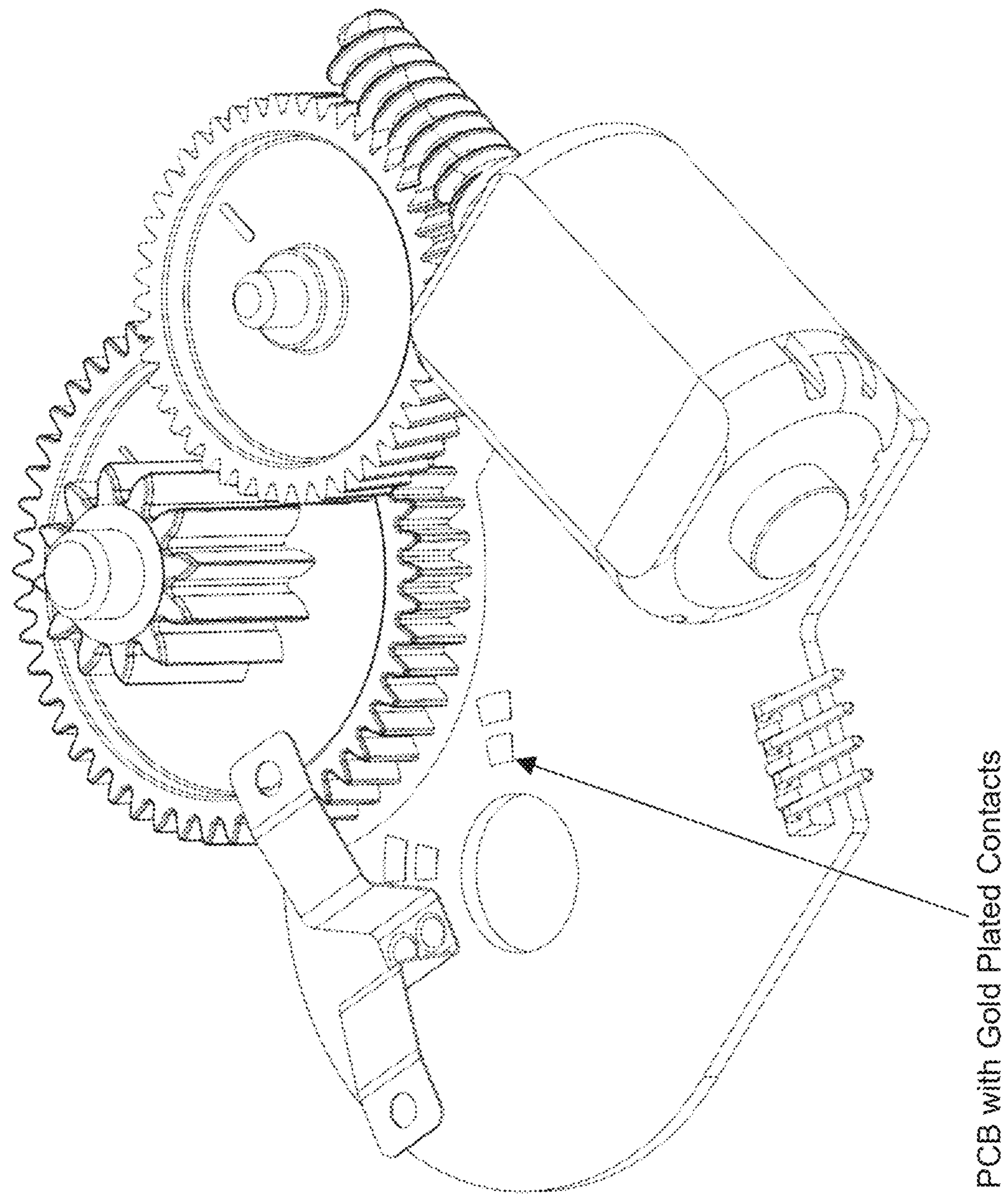
FIGS. 12A and 12B are perspective views of an actuator with a sliding switch in accordance with the present invention.
Figure 12B:
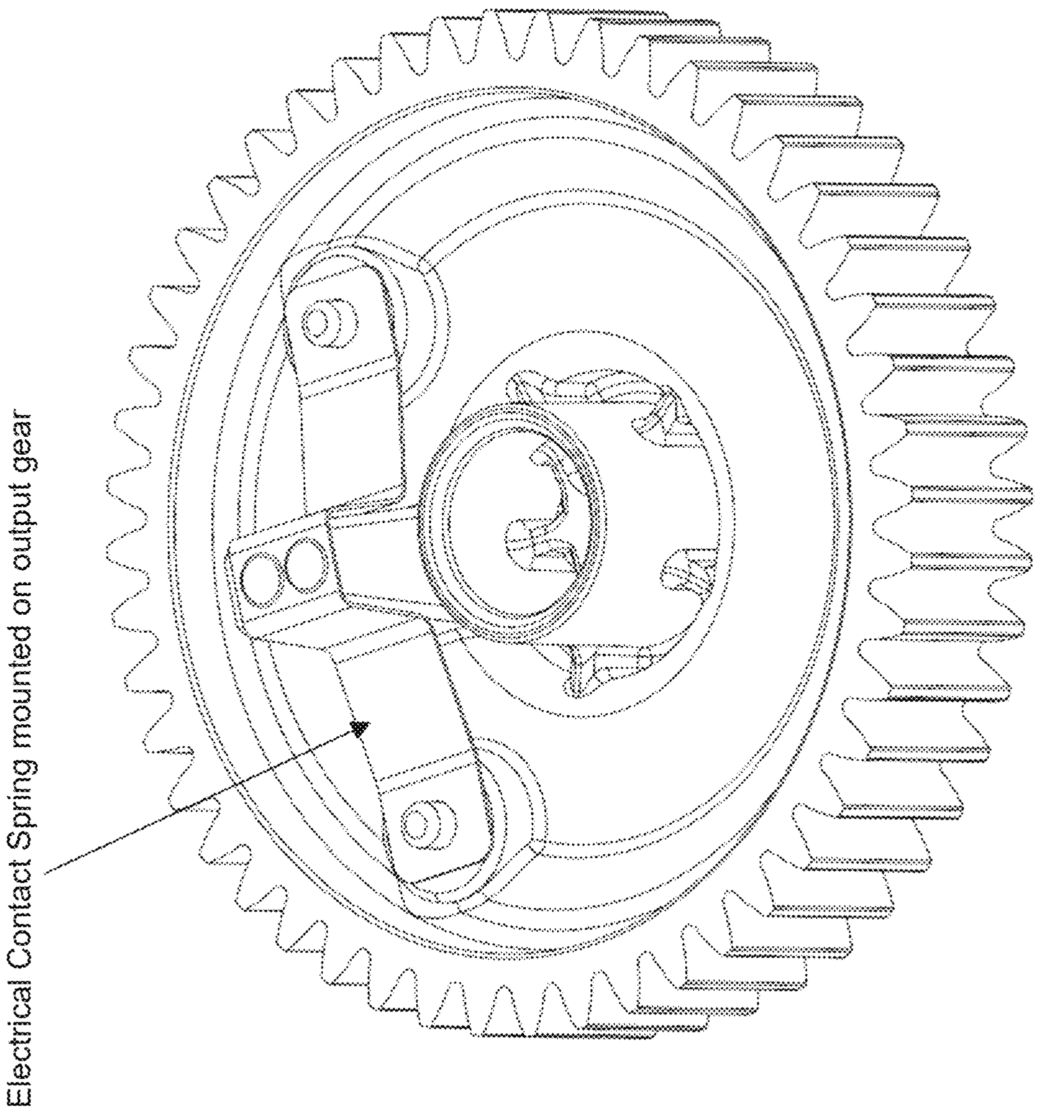

Referring now to FIGS. 12A and 12B, whiles examples herein have discussed limit switches, any indication of the indicators position may be used. For example, the PCB, instead of limit switches, may include contacts (e.g., gold-plated contacts) (FIG. 12A). In this example, the indicator includes an electrical contact spring mounted on the output gear (FIG. 12B). As the output gear and indicator rotate, the contact springs will pass the contacts and electrically close the circuit (i.e., a sliding switch).

Figure 13A:
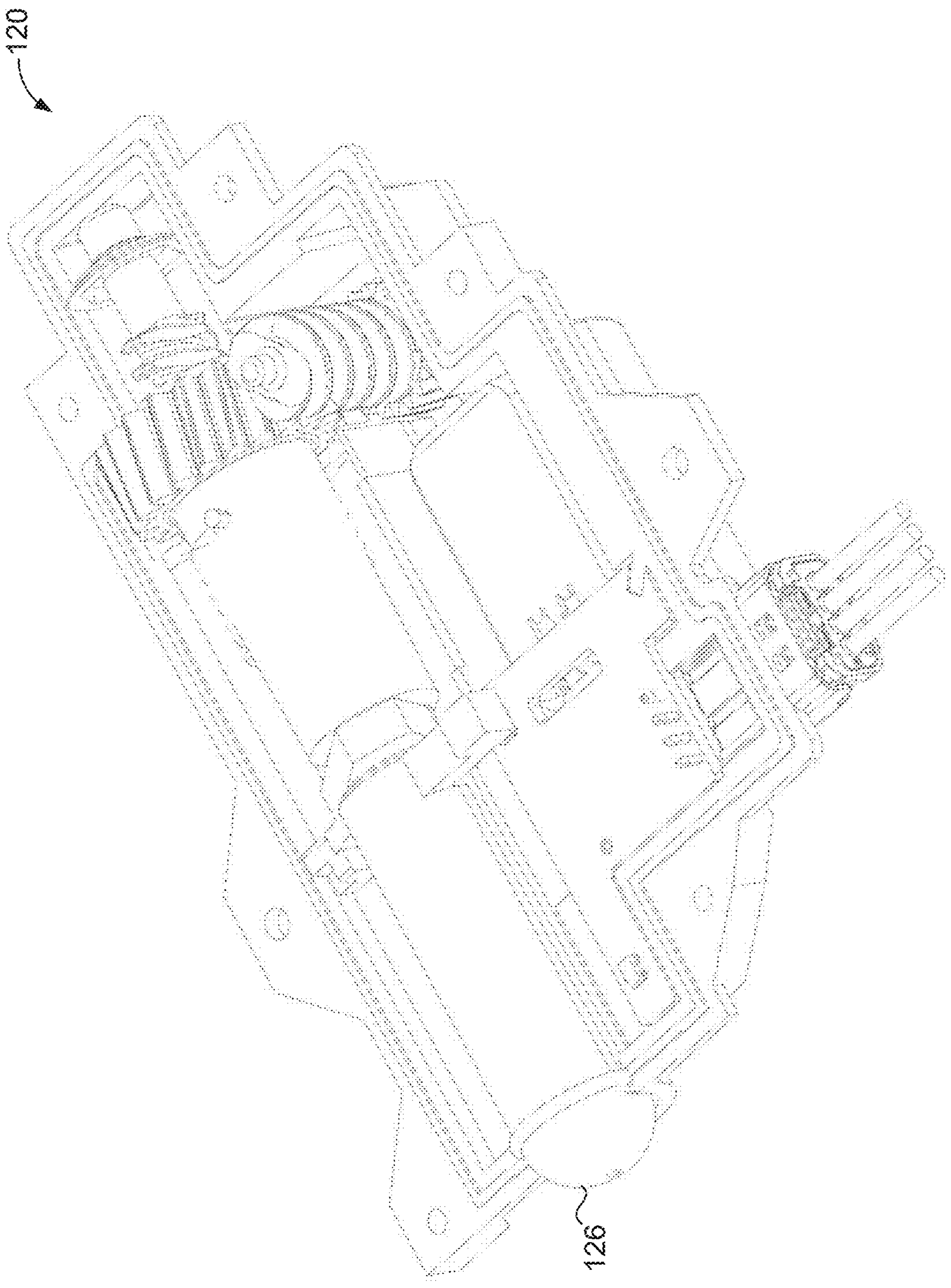
FIGS. 13A and 13B are perspective views of an actuator disposed on an output of a plunger.
Figure 13B:
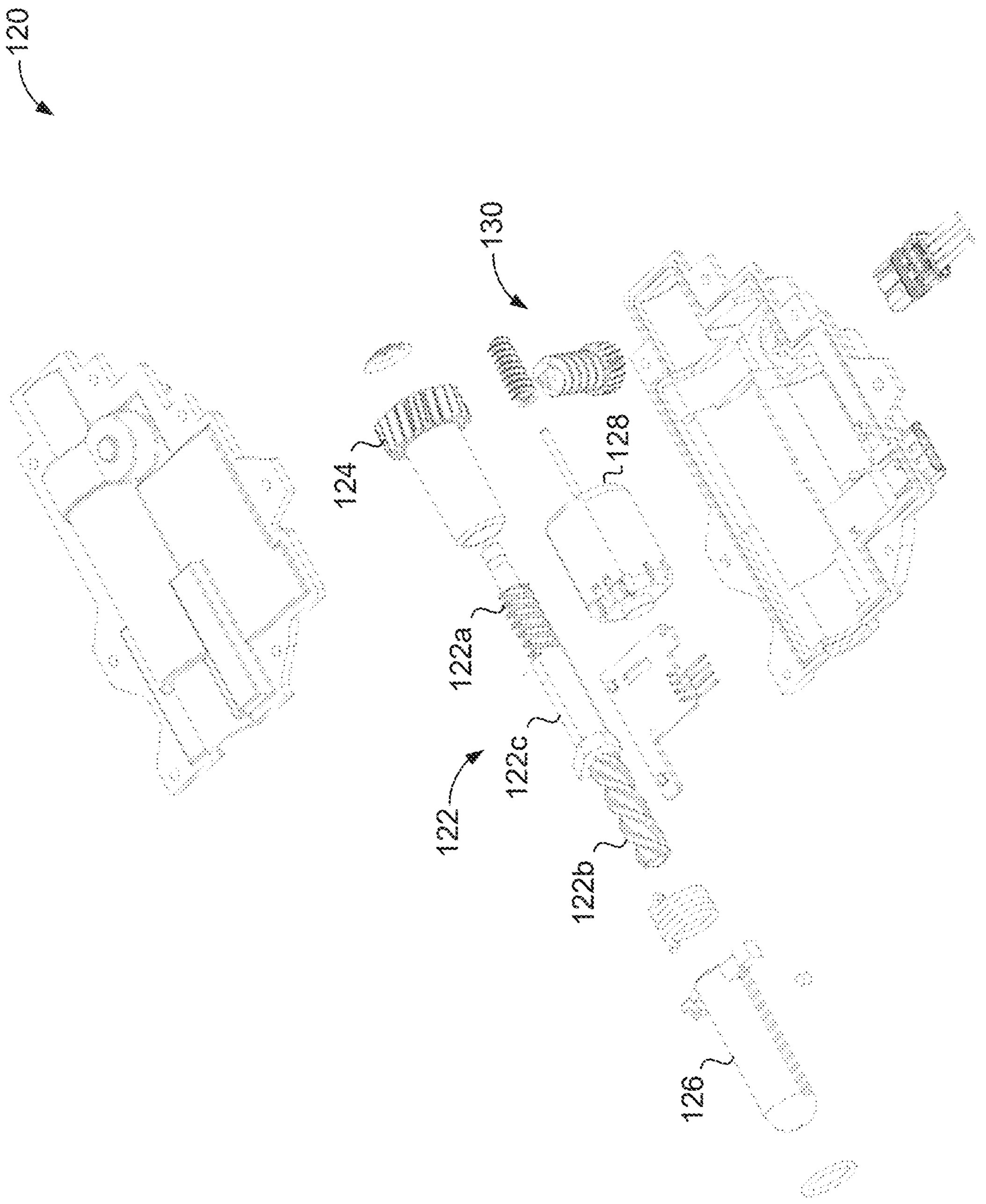

Referring now to FIGS. 13A and 13B, in some examples, the actuator is a linear style actuator. For example the actuator includes aspects described in U.S. provisional application Ser. No. 63/201,346, filed on Apr. 26, 2021, which is hereby incorporated herein by reference in its entirety. The actuator thus may comprise a variable speed actuator 120 that includes a variable lead screw 122, which includes a finer pitch gear end or portion 122*a* (that is rotatably received in an internal gear passageway of a gear 124) and a coarser pitch gear end or portion 122*b* (that is rotatably received in an internal gear passageway of a plunger 126), with a central portion 122*c* between the gear portions 122*a*, 122*b*. In these examples, a switch or sensor may be placed on an output plunger moving in and out of the actuator to determine a position of the door handle (e.g., flush, deployed, etc.).

When the plunger 126 is retracted (and the handle portion is in the flush state), the lead screw 122 is positioned so that the central portion 122*c* of the lead screw 122 is at the gear 124 and so that the distal end of the finer pitch gear end 122*a* is spaced from the opposite side of the gear 124 and the coarser pitch gear end 122*b* is disposed within the plunger 126 (i.e., the plunger 126 is retracted along the coarser pitch gear end 122*b*). When the actuator 120 is initially operated to begin deploying the handle portion from the flush state, the gear 124 is rotated (via operation of a motor 128 and rotation of the motor output gears 130), which causes the lead screw 122 to move longitudinally outward. Thus, the finer pitch gears (i.e., the finer pitch gear portion 122*a* and the internal gear of the gear 124) function to move the lead screw 122 (and plunger 126) to a first extended or partially extended position, which pivots the handle portion partially outward. As the lead screw 122 moves outward, the central portion 122*c* moves outward. This initial extension is achieved at a slower speed and higher torque, and thus can break the handle portion free of ice or the like that may otherwise inhibit the initial deployment of the handle portion.

Further operation of the motor 128 (and thus further rotation of the gears 130) causes the lead screw 122 to rotate. The rotation of the lead screw 122 causes more rapid extension of the plunger 126 due to the rotation of the coarser pitch gear portion 122*b* within the internal gear of the non-rotatable plunger 126. Thus, even though the motor revolutions per minute (RPM) may be the same, the rate of extension of the plunger 126 increases from the initial deployment (via longitudinal movement of the lead screw 122) to the later deployment (via rotation of the lead screw 122).

One or more switches may be disposed on the plunger and be opened/closed (e.g., via ramps as described above) as the plunger extends and retracts. Additionally or alternatively, one or more switches may be opened or closed by ramps or other constructs on the surface of the plunger that make contact with the switches as the plunger extends and retracts. As with the examples above, the opening and closing of switches may inform the actuator 120 and/or the DCM of the position of the plunger (and thus the position of the door handle) based on the status of the one or more switches. Based on the position of the plunger 126, the system may determine when it is appropriate to enable and disable the motor 128 (e.g., disengage the motor 126 when the handle is flush or deployed).

Thus, the door handle assembly herein includes an actuator configured to track/detect the position of a flush door handle actuator output shaft. The actuator may provide the position to a DCM and the DCM may intelligently control the power to the actuator/motor to prevent stalling and other wear and tear. Alternatively, the actuator does not provide the position to the DCM and instead gates power to the motor internally (i.e., a self-contained shut off actuator). Thus, the DCM provides input power to the actuator and motor and the actuator optionally provides positional feedback to the DCM. Based on the positional feedback, the actuator or the DCM automatically shut off power to the motor. The actuator may include a microcontroller or other processing element to control the motor. Alternatively, the actuator may rely entirely on discrete logic (e.g., transistors). When providing feedback to the DCM, the actuator may use dedicated switched circuits with a shared ground wire or any other appropriate option such as resistor ladder logic (e.g., each position encoded by the switches results in a different resistance in or out of the circuit), analog voltage, or a communication bus (e.g., CAN, I2C, etc.). The actuator may use any number of position detection options, such as mechanical switches with ramps/dents on the output gear (FIGS. 6-7C), contacts on the PCB and spring finger contacts on the output gear(s), or carbon ink resistive traces on the PCB and spring contacts on the gear train. Other options include inductive positional sensors, optical encoders, Hall Effect sensors, reed switches with magnets, and force sensitive resistors.

Optionally, the movement of the door handle to its partially extended or graspable position may be done in conjunction with other functions, such as activation of one or more vehicle exterior lights (such as ground illumination lights or headlights or turn signal lights or the like) or such as activation of one or more vehicle interior lights or such as actuation of the vehicle horn or other signal to alert the user that the door handle is moved to its graspable position. Control circuitry or logic to provide the dual or multiple functions can piggyback on one common control system.

Optionally, the control circuitry or logic to control or extend the handle portion may include a lockout function so that the control will not and cannot extend the handle when it is not appropriate to open the door of the vehicle. For example, the lockout function may limit or preclude extension of the door handle when the vehicle is in a forward or reverse gear or when the vehicle ignition is on or following a period of time (such as about twenty seconds or more or less) after the vehicle ignition is turned on or when the vehicle is moving at or above a threshold speed (such as, for example, at or above about three mph or about five mph or other selected threshold vehicle speed) or the like. When one or more of these conditions (and optionally one or more other conditions depending on the particular application) is detected, the control limits or precludes extension of the handle to its graspable position irrespective of receipt of other inputs, such as a door unlock button actuation or a passive entry system signal or the like.

Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door) and/or such as a handle assembly of the types described in U.S. Pat. Nos. 6,349,450; 6,550,103 and/or 6,907,643, which are hereby incorporated herein by reference in their entireties) or other type of vehicle door handle assembly, while remaining within the spirit and scope of the present invention. Optionally, the door handle assembly may include a soft touch handle portion, such as utilizing the principles described in U.S. Pat. Nos. 6,349,450; 6,550,103 and/or 6,907,643, incorporated above.

Optionally, the door handle assembly may include an antenna or the like, such as for sensing or transmitting signals, such as described in U.S. Pat. No. 6,977,619, which is hereby incorporated herein by reference in its entirety. For example, the handle assembly may include an antenna or sensor (such as an antenna and/or capacitive sensor) at the handle portion and/or may include a passive entry device or element. The antenna or sensor and/or passive entry device may receive a signal from a transmitting device (such as from a key fob or the like carried by the driver of the vehicle) and/or may sense or detect the presence of or proximity of a person or person's hand at or near the door handle, and may generate an output signal indicative of such detection. The actuator may be responsive to the antenna and/or sensor and/or device to impart an outward movement of the door handle portion so that the user can grasp the handle portion to open the door of the vehicle.

Optionally, the extendable flush door handle assembly of the present invention may provide an energy generating feature. For example, the handle can act as a generator to create energy for the use of powering emergency devices (such as, for example, an electric latch, lighting, and/or the like) on a vehicle when the vehicle battery is low in power. By using an actuator with a back drivable gear train, the user could cycle the handle manually and generate power by rotating a motor. Other power generation methods could include, but are not limited to, power savaging, induction coils, Piezo electric materials, a pre-charged capacitor, Peltier devices, and/or power transfer from external devices. The generated power can be stored in one or more batteries or capacitors disposed at the vehicle door or in the vehicle.

Optionally, the extendable flush door handle assembly of the present invention may provide one or more bumpers, which can be used to reduce the sound that the handle makes while returning to its closed or flush position. The bumpers can be placed to maintain the gap between the handle and the sheet metal of the vehicle door when the handle is in its flush position.

Although shown and described as being a generally horizontally oriented handle portion that pivots about a generally vertical pivot axis, it is envisioned that the handle of the extendable flush door handle assembly may be oriented in any manner while remaining within the spirit and scope of the present invention. For example, the handle may be oriented so that it is either vertical, horizontal, or diagonal with respect to the ground. Also, although shown and described as an exterior door handle for opening a side door or rear door or lift gate of a vehicle from exterior the vehicle, it is envisioned that the extendable flush door handle assembly may be suitable for use as an interior handle for opening a side door or rear door or liftgate of a vehicle from inside the vehicle, while remaining within the spirit and scope of the present invention.

Optionally, the door handle assembly or module may incorporate other features or accessories, such as, for example, a blind spot indicator device or element and/or a turn signal indicator device or element, such as by utilizing aspects of the devices described in U.S. Pat. Nos. 8,786,704; 8,058,977; 7,944,371; 7,492,281; 6,198,409; 5,929,786 and/or 5,786,772, which are hereby incorporated herein by reference in their entireties. The signal indicator or indication module may include or utilize aspects of various light modules or systems or devices, such as the types described in U.S. Pat. Nos. 7,626,749; 7,581,859; 6,227,689; 6,582,109; 5,371,659; 5,497,306; 5,669,699; 5,823,654; 6,176,602 and/or 6,276,821, which are hereby incorporated herein by reference in their entireties.

Optionally, the door handle assembly or module may include or may be associated with an antenna for receiving signals from or communicating with a remote device. For example, the antenna (such as, for example, an antenna of the types described in U.S. Pat. No. 6,977,619, which is hereby incorporated herein by reference in its entirety) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system, while remaining within the spirit and scope of the present invention.

Changes and modifications to the specifically described embodiments may be carried out without departing from the principles of the present invention, which is intended to be limited only by the scope of the appended claims as interpreted according to the principles of patent law.

The invention claimed is:

1. A vehicular exterior door handle assembly, the vehicular exterior door handle assembly comprising:

a base portion disposed at a door handle region of a vehicle door;

a handle portion including a base end, a swing end, and a grasping portion disposed between the base end and the swing end;

wherein the handle portion is movable relative to the base portion between a recessed position, where the grasping portion of the handle portion is recessed at the base portion, and a deployed position;

wherein, when in the deployed position, the grasping portion of the handle portion protrudes outward from the base portion so as to be graspable by a user;

an actuator comprising a motor that is electrically operable in response to an input signal, wherein the motor comprises an output shaft operably coupled to an output gear of the actuator, and wherein the output gear is operably coupled to the handle portion to move the handle portion between the recessed position and the deployed position;

wherein the actuator comprises a position indicating element, provided on the output gear, that indicates a plurality of positions of the output gear of the actuator, and wherein the position indicating element comprises a first ramp to indicate a first position of the output gear of the actuator that corresponds with the handle portion being in the recessed position when the output gear rotates in a first direction, and wherein the position indicating element comprises a second ramp to indicate a second position of the output gear of the actuator that corresponds with the handle portion being in the deployed position when the output gear rotates in a second direction, and wherein the first position is different from the second position;

wherein the actuator comprises at least one position switch that is actuated by the position indicating element when the output gear is at the first position or the second position;

wherein, responsive to the input signal, the motor operates and the actuator moves the handle portion between the recessed position and the deployed position;

wherein, as the motor operates to move the handle portion, the position indicating element indicates when the output gear arrives at (i) the first position or (ii) the second position; and wherein, responsive to the at least one position switch being actuated by the position indicating element when the output gear arrives at the first position or the second position, the actuator depowers the motor without the output gear reaching a hard stop.

2. The vehicular exterior door handle assembly of claim 1, wherein the actuator comprises a printed circuit board comprising the at least one position switch.

3. The vehicular exterior door handle assembly of claim 1, wherein the output shaft of the motor rotates the output gear to move the handle portion between the recessed position and the deployed position.

4. The vehicular exterior door handle assembly of claim 3, wherein the position indicating element is rotationally locked to the output gear.

5. The vehicular exterior door handle assembly of claim 3, wherein the actuator comprises two hard stop positions that limit to the rotation of the output gear, and wherein, responsive to the position indicating element indicating the output gear arrived at the first position or the second position, the actuator depowers the motor prior to the output gear reaching a respective one of the two hard stop positions.

6. The vehicular exterior door handle assembly of claim 1, wherein, responsive to a threshold period of time elapsing while the motor operates, the actuator depowers the motor.

7. A vehicular exterior door handle assembly, the vehicular exterior door handle assembly comprising:

a door control module;

a base portion disposed at a door handle region of a vehicle door;

a handle portion including a base end, a swing end, and a grasping portion disposed between the base end and the swing end;

wherein the handle portion is movable relative to the base portion between a recessed position, where the grasping portion of the handle portion is recessed at the base portion, and a deployed position;

wherein, when in the deployed position, the grasping portion of the handle portion protrudes outward from the base portion so as to be graspable by a user;

an actuator including a motor that is electrically operable in response to an input signal, wherein the motor comprises an output shaft operably coupled to an output gear of the actuator, and wherein the output gear is operably coupled to the handle portion to move the handle portion between the recessed position and the deployed position;

wherein the actuator comprises a first hard stop position that limits rotation of the output gear in a first direction, and wherein the actuator comprises a second hard stop position that limits rotation of the output gear in a second direction;

wherein the actuator comprises a position indicating element, provided on the output gear, that indicates a plurality of positions of the output gear of the actuator, and wherein the position indicating element comprises a first ramp to indicate a first position of the output gear of the actuator that indicates that the handle portion is in the recessed position when the output gear rotates in a first direction, and wherein the position indicating element comprises a second ramp to indicate a second position of the output gear of the actuator that indicate that the handle portion is in the deployed position when the output gear rotates in a second direction, and wherein the first position is different from the second position;

wherein the actuator comprises at least one position switch that is actuated by the position indicating element when the output gear is at the first position or the second position;

wherein the door control module transmits the input signal to the actuator;

wherein, responsive to the input signal, the motor operates and the actuator moves the handle portion between the recessed position and the deployed position;

wherein, as the motor operates to move the handle portion, the position indicating element indicates when the output gear arrives at (i) the first position or (ii) the second position;

wherein, responsive to the at least one position switch being actuated by the position indicating element when the output gear arrives at the first position or the second position, the actuator transmits the position of the output gear to the door control module; and wherein, responsive to receiving the position of the output gear, the door control module depowers the motor without the output gear reaching the first hard stop position or the second hard stop position.

* * * * *